(12) United States Patent
Forman

(10) Patent No.: US 11,436,545 B2
(45) Date of Patent: *Sep. 6, 2022

(54) SYSTEM AND A METHOD FOR CALCULATING MONETARY VALUE OF RISK FROM A HIERARCHY OF OBJECTIVES

(71) Applicant: Ernest Forman, Boynton Beach, FL (US)

(72) Inventor: Ernest Forman, Boynton Beach, FL (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/803,191

(22) Filed: Feb. 27, 2020

(65) Prior Publication Data

US 2020/0193350 A1     Jun. 18, 2020

Related U.S. Application Data

(63) Continuation of application No. 16/458,132, filed on Jun. 30, 2019, now abandoned, which is a continuation-in-part of application No. 14/032,467, filed on Sep. 20, 2013, now Pat. No. 10,360,524.

(60) Provisional application No. 61/826,324, filed on May 22, 2013.

(51) Int. Cl.
  *G06G 7/48* (2006.01)
  *G06Q 10/06* (2012.01)

(52) U.S. Cl.
  CPC ... *G06Q 10/0635* (2013.01); *G06Q 10/06315* (2013.01); *G06Q 10/06375* (2013.01); *G06Q 10/06393* (2013.01)

(58) Field of Classification Search
  None
  See application file for complete search history.

(56) References Cited

U.S. PATENT DOCUMENTS

| | | | | |
|---|---|---|---|---|
| 7,308,388 B2 * | 12/2007 | Beverina | ............. | G06Q 20/203 703/2 |
| 7,319,971 B2 * | 1/2008 | Abrahams | .......... | G06Q 10/0635 705/7.28 |
| 7,610,257 B1 * | 10/2009 | Abrahams | ............. | G06Q 20/10 705/38 |
| 7,778,897 B1 * | 8/2010 | Rachev | .................. | G06Q 40/06 705/35 |
| 2003/0149657 A1 * | 8/2003 | Reynolds | ............... | G06Q 40/08 705/38 |
| 2004/0059592 A1 * | 3/2004 | Yadav-Ranjan | ..... | G06Q 50/165 705/315 |
| 2006/0173762 A1 * | 8/2006 | Clater | .................... | G06Q 10/06 705/35 |
| 2007/0016542 A1 * | 1/2007 | Rosauer | ................. | G06N 5/022 706/21 |

\* cited by examiner

*Primary Examiner* — Sunit Pandya

(57) ABSTRACT

Disclosed is a system for converting ratio scale measures of risks to monetary value in a defined environment by a user over a communication network. The system includes a processor, an input unit coupled to the processor for receiving inputs from the user, a display unit to display processed information received from the processor, and a data storage for storing instructions related to risk events. The processor is configured to receive a list of risk events, objectives, a list of causes, generate a ratio scale prioritized hierarchy of importance of objectives; likelihoods of causes of the risk events; risk events likelihoods; risks of risk events; receive input from the user with an estimated monetary value of at least one of the and compute the monetary amounts of all the objectives.

5 Claims, 33 Drawing Sheets

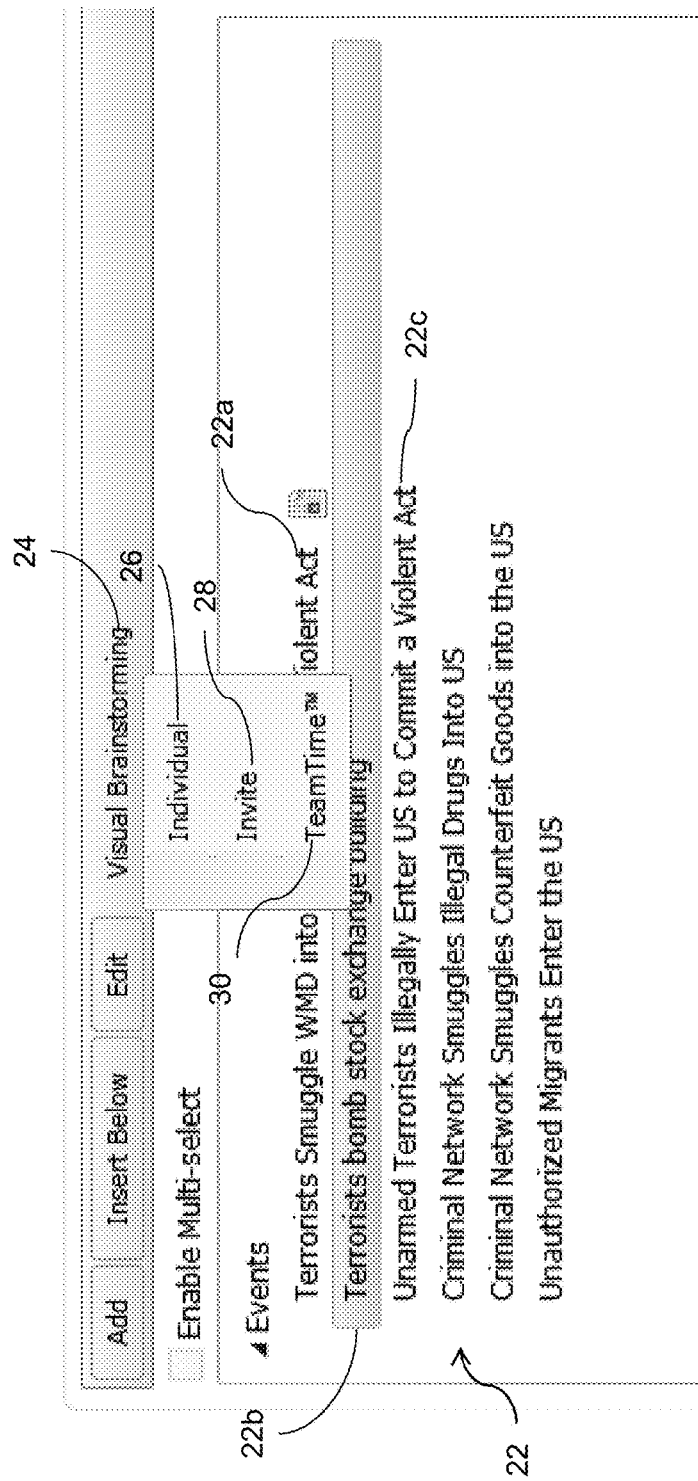
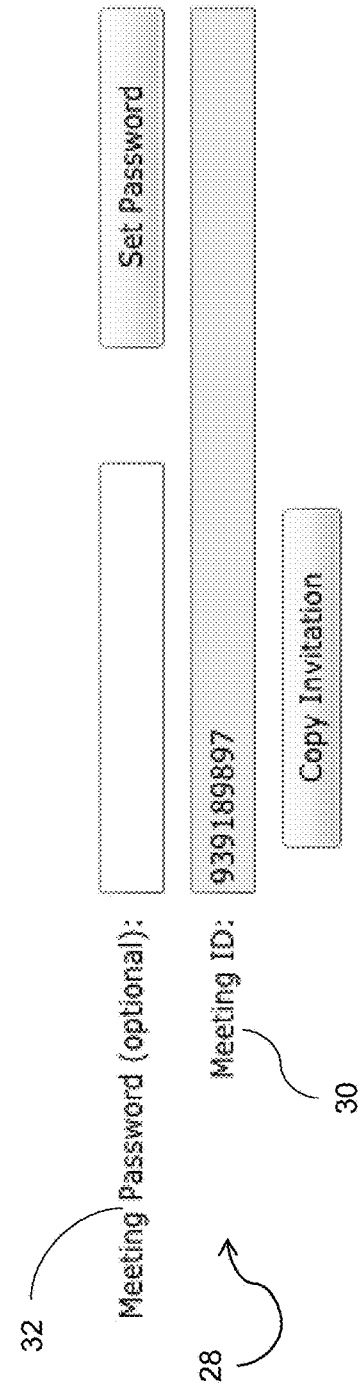
Fig. 2a
FIG. 2b

You have completed prioritizing the impact of the Objectives with respect to "Losses." Review your results below to ensure they make sense to you. If not, you may navigate back to the previous judgments to edit them.

Importance of "Losses"

| | Name | Participant Results | Graph Bar |
|---|---|---|---|
| 1 | Loss of Life | 32.11 % | |
| 2 | Economic Costs | 14.64 % | |
| 3 | Loss of Confidence in Government | 2.56 % | |
| 4 | Decrease in Feeling of Security / Increase of Fear | 4.71 % | |
| 5 | Loss of Confidence in the Financial Sector | 13.49 % | |
| 6 | Impairment to Social Services | 2.98 % | |
| 7 | Damage to the Environment | 4.56 % | |
| 8 | Loss of US Citizen Jobs | 17.39 % | |
| 9 | Increase of Consumer Fees / Cost of Goods | 7.56 % | |

42

Click here if you think the priorities are not reasonable — 48

Navigation Box

Steps: 1 ... 13 14 15 16 17 18 19 20 21 ... 33    Evaluated: 31/31

FIG. 4c

| Create new scale | Edit existing scale(s) | | | |
|---|---|---|---|---|
| Measure Events With Respect To | | Measurement Type | Measurement Scale | Action |
| ▲ Impact | | | | |
| Loss of Life | | Rating Scale ▼ | Default Likelihood Rating Scale ▼ | Copy  Edit |
| Economic Costs | | Rating Scale ▼ | Default Impact Rating Scale ▼ | Copy  Edit |
| Loss of Confidence in Government | | Rating Scale ▼ | Default Impact Rating Scale ▼ | Copy  Edit |
| Decrease in Feeling of Security/ Increase of | | Rating Scale ▼ | Default Impact Rating Scale ▼ | Copy  Edit |
| Loss of Confidence in the Financial Sector | | Rating Scale ▼ | Default Impact Rating Scale ▼ | Copy  Edit |
| Impairment to Social Services | | Rating Scale ▼ | Default Impact Rating Scale ▼ | Copy  Edit |
| Damage to the Environment | | Rating Scale ▼ | Default Impact Rating Scale ▼ | Copy  Edit |
| Loss of US Citizen Jobs | | Rating Scale ▼ | Default Impact Rating Scale ▼ | |
| Increase of Consumer Fees / Cost of Goods | | Rating Scale ▼ | Default Likelihood Rating Scale ▼ | Copy  Edit |

Pairwise Comparison
Rating Scale
Simple Utility Curve
Direct Priority Input
Step Function Ascending

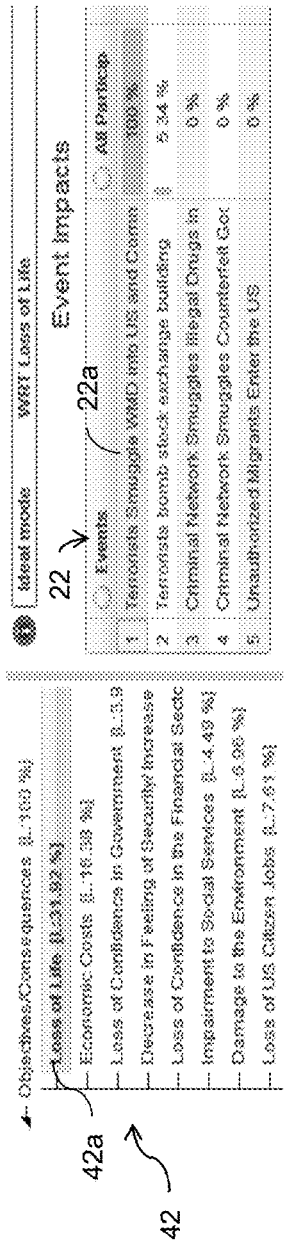
FIG. 4h(i)
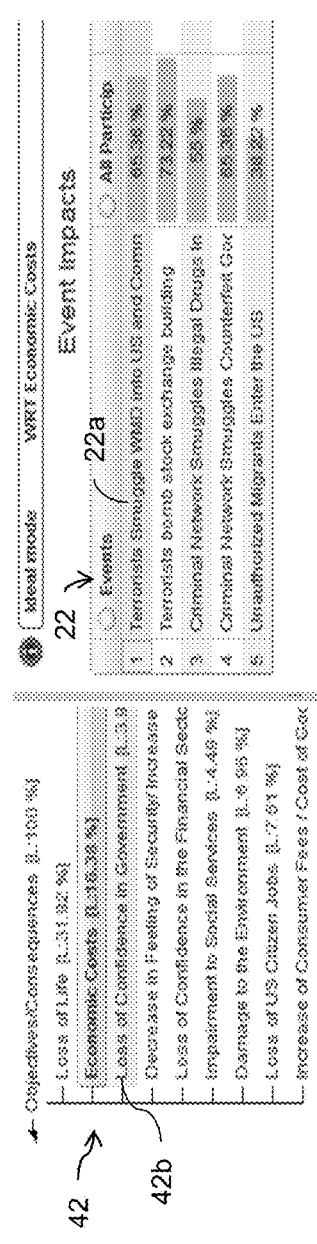
FIG. 4h(ii)
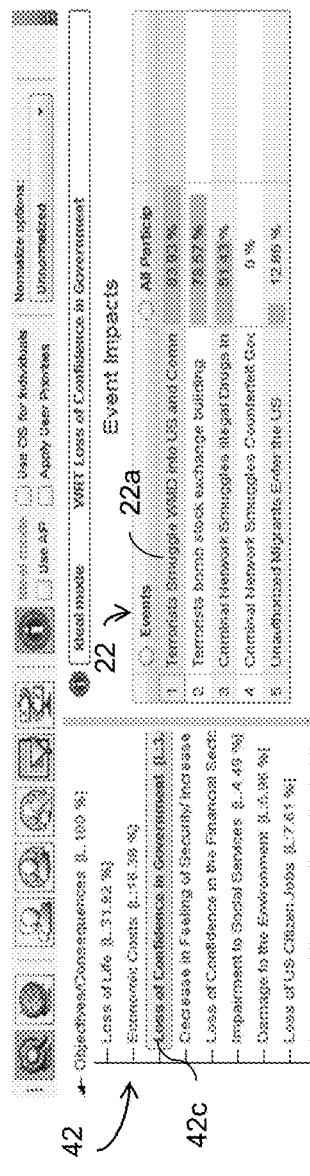
FIG. 4h(iii)

| Create new scale | Edit existing scale(s) | | |
|---|---|---|---|
| Measure Events With Respect To | Measurement Type | Measurement Scale | Action |
| ▲ Likelihood | | | |
| Strengthening of Terrorists Cells | Pairwise Comparison ▼ | | Copy |
| Lack of Intelligence Gathering and Sharing | Pairwise Comparison | | Copy |
| Severe Funding Pressures | Rating Scale | | Copy |
| Ineffective Personnel Capabilities | Simple Utility Curve | | Copy |
| Inadequate Border Enforcement Technology | Direct Priority Input | | Copy |
| Undeveloped Integrated Border Management Approach and Co | Step Function Ascending | | Copy |
| Inadequate Harmonization with Foreign Jurisdictions | Pairwise Comparison ▼ | | Copy |
| Lack of Political Will or Non-Partisanship to Address Issue | Pairwise Comparison ▼ | | Copy |
| Strengthening of Organized Crime Groups | Pairwise Comparison ▼ | | Copy |

FIG. 6g (iii)
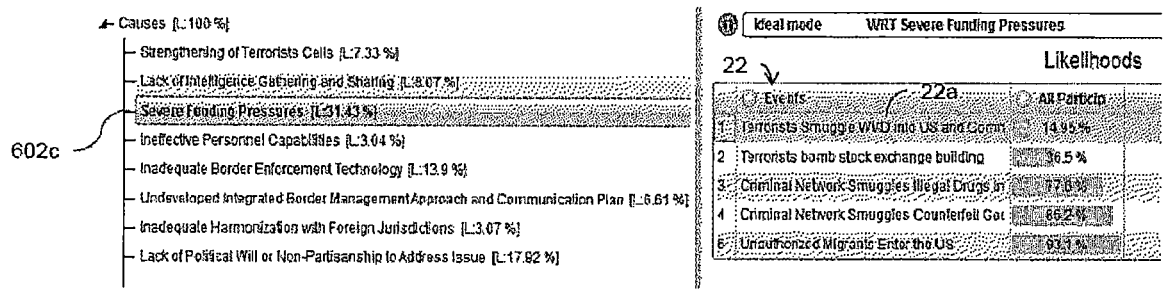

Controls for Cause "Strengthening of Terrorists Cells"

Name:

Description:

808 →  Name | Priority | Comment
--- | --- | ---
Education | —○— 0.2 | 
Plant spies | —○— 0.15 |

Add a control ← 812

FIG. 8e

SYSTEM AND A METHOD FOR CALCULATING MONETARY VALUE OF RISK FROM A HIERARCHY OF OBJECTIVES

CROSS-REFERENCE TO RELATED APPLICATION

The present application is a continuation patent application of the U.S. Ser. No. 16/458,132 filed on Jun. 30, 2019. The U.S. Ser. No. 16/458,132 application is also a continuation in part of the U.S. Ser. No. 14/032,467 application filed on Sep. 20, 2013, which further claims priority to a U.S. Provisional Application No. 61/826,324 filed on May 22, 2013, the entire contents of which are incorporated herein by references in its entirety.

BACKGROUND OF THE INVENTION

1. Field of the Invention

The present invention generally relates to a method and a system for providing risk management and more particularly relates to a method and a system for providing risk management by developing ratio scales measures for assessing and mitigating risks.

2. Description of the Related Art

Risk is the possibility of incurring a loss when an event takes place. Rather than referring to a risk, we instead, refer to an event and its likelihood, its impact, and its risk (the likelihood times the impact). Various methods are used to identify risk in events. One way is with a collaborative brainstorming involving participants at possibly geographically separated sites, using a whiteboard to enter events proposed for consideration (as practiced in Expert Choice Comparion).

Alternatively, and possibly used in conjunction, assets are identified and brainstorming is performed for each such asset to suggest events that might occur to diminish the value of the asset. Alternatively, and possibly used in conjunction, objectives (from an organizations objectives hierarchy as practiced in Expert Choice Desktop and Expert Choice Comparion) are considered to suggest events that might occur to diminish the achievement of each objective.

The identification, analysis, and treatment of risk occur in almost every facet of life including personal, business, and government. Whereas the focus of planning is to maximize the achievement of objectives, the focus of risk management is to minimize the expected loss or impact on objectives occurring from events that may or may not occur.

Risk Assessment consists of three parts—the evaluation and quantification of the impact of each event, the likelihood of each event, and the risk of each event. Evaluation and quantification of event impact is a necessary part of risk management. Further, it involves identifying risks, analyzing their likelihood of occurrence and impact on objectives, identifying controls that can reduce the likelihood of occurrence and/or impact on objectives, and allocating resources so as to minimize the expected losses.

Generally, the methods adopted for risk assessment techniques are ordinal measures for risk impact and likelihood, such as numbers 1 through 5. Some may even involve analytical hierarchal process. However, these methods are not accurate and were not giving optimized results. Therefore, there is a need of a system and a method to utilize the measurement of both the likelihoods and impacts of risk events with ratio scale measures. Furthermore, there is a need of the system to provide a monetary value of the impact of the of risk events on each of the objectives.

SUMMARY OF THE INVENTION

In accordance with the teachings of the present invention, a system, a method, and a computer program is provided for assessing and mitigating risk events from the events occurring in a defined environment.

An object of the present invention is to provide a system, a method and a computer program for assessing and mitigating risk events by identifying risky events, developing ratio scale measures for impact of events and likelihood of events and deriving measures of risk events by multiplying the ratio scale measures for impacts with the ratio scale measures for likelihoods of the identified risk events.

Another object of the present invention is to derive ratio scale measurements for the impacts of the identified risk events by defining objectives, associating identified risk events with the objectives and deriving the ratio scale measurement through the association of defined objectives with the identified risk events.

Another object of the present invention is to derive ratio scale measurements for the likelihoods of the identified risk events by identifying causes leading to occurrence of the identified risk events, associating the identified causes with the identified risk events for detecting vulnerability of the events to the identified causes, measuring likelihoods of the risk events by the sum-product of the probabilities of the identified causes times the probability of the risk events given the identified causes and deriving the ratio scale measurement by the sum-product of the identified causes times the measured vulnerability of the risk events.

Another object of the present invention is to provide information documents for gathering and presenting information relating to the risk events, causes, objectives, relationship of the risk events with causes and relationship of the risk events with the objectives.

Another objective of the present invention is to provide control effectiveness by defining controls for the causes, vulnerabilities and consequences of risk events; and deriving control effectiveness for reducing the causes, vulnerabilities and consequences of risk events.

Another objective of the present invention is to provide allocation of resources to controls for reducing risk to the objectives of the defined environment.

Another objective of the present invention is to provide an option of adding participants for measuring and mitigating risk events and defining participant roles for identifying risk event, causes and objectives for measuring and reducing risk to the objectives of the defined environment.

Another objective of the present invention is to generate reports for measuring and reducing risk to the objectives of the defined environment.

These and other objects, features and advantages of the invention will become more fully apparent in the following detailed description, taken in conjunction with the accompanying drawings.

BRIEF DESCRIPTION OF DRAWINGS

FIG. 2a is a screenshot showing, by way of an Example, a Web Page for showing identified risk events;

FIG. 2b is a screenshot showing, by way of an Example, a Web Page for inviting to a TeamTime through an Invite;

FIG. 4C is a screenshot showing, by way of an Example, a Web Page for determining ratio scale results for the importance of objectives;

FIG. 4D is a screenshot showing, by way of an Example, a Web Page for selecting a method to use to evaluate the impact of the risk events on an objective;

FIG. 4F is a screenshot showing, by way of an Example, a Web Page for overall event impacts;

FIG. 4H shows an exemplary embodiment of showing resulting ratio scale measurements of impacts for the identified risk events with respect to the objectives/consequences in accordance with a preferred embodiment;

FIG. 4H (i) indicates the priorities determined by the 'All Participants' for the impact of one of the identified risk events with respect to the objective/consequence;

FIG. 4H (ii) indicates the priorities determined by 'All Participants' for the impact of one of the identified risk events with respect to the objective/consequence;

FIG. 4H (iii) indicates the priorities determined by 'All Participants' for one of the identified risk events with respect to the objective/consequence;

FIG. 6B is a screenshot showing, by way of an Example, a Web Page for showing various options of measurement type for measuring the risk events with respect to their likelihoods;

FIG. 6F is a screenshot showing, by way of an Example, a Web Page for showing the sum-product of the likelihoods of causes and the likelihoods of the risk events given the causes;

FIG. 6G shows an exemplary embodiment of showing measurement of likelihoods for the identified risk events with respect to the objectives/consequences in accordance with a preferred embodiment;

FIG. 6G (i) indicates the priorities of the participants for one of the identified risk event with respect to one of the causes;

FIG. 6G (ii) indicates the priorities of the participants for the likelihood of one of the identified event with respect to the causes;

FIG. 6G (iii) indicates the priorities of the participants for the likelihood of one of the identified event 22 with respect to the causes;

FIG. 8E is a screenshot showing, by way of an Example, a Web Page for showing an exemplary method for obtaining ratio scale measures of the effectiveness of controls to reduce the likelihood of two causes;

DETAILED DESCRIPTION OF DRAWINGS

Figure 1:
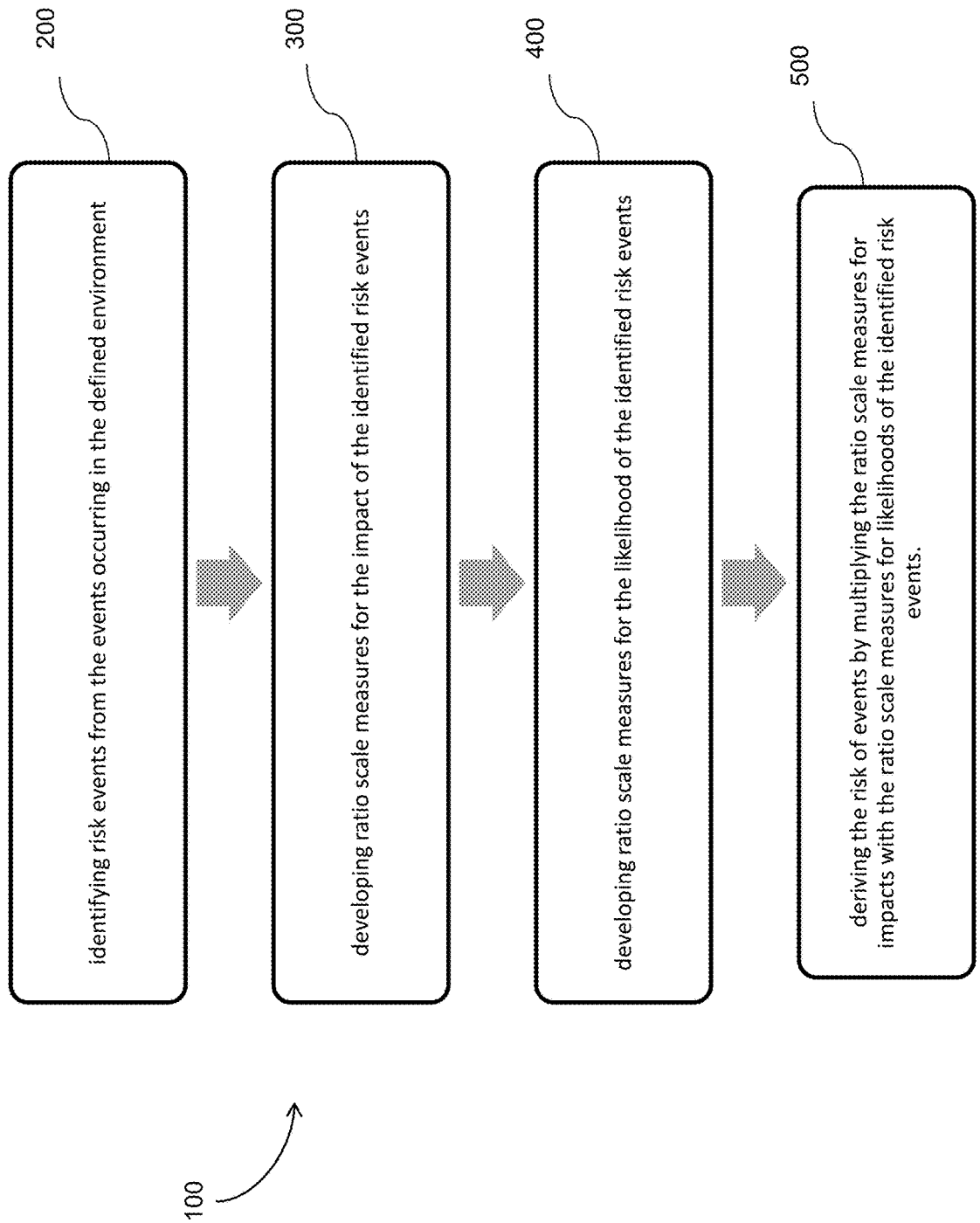
FIG. 1 illustrates a flowchart of a method for measuring and mitigating risk events in accordance with a preferred embodiment of the present invention.

While this technology is illustrated and described in a preferred embodiment, a system, a method and a computer program measuring and mitigating risk events may be produced in many different configurations, forms and computer language. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a flowchart of a method 100 for measuring and mitigating risk events from the events occurring in a defined environment. The method 100 initiates with a step 200 to identify risk events from the events occurring in the defined environment. The risk events are identified by collaborative brainstorming involving participants at possibly separated geographical sites. The step 200 is explained in detailed in conjunction with FIG. 2A, FIG. 2B and FIG. 2C of the present invention.

The step 200 is then followed by a step 300 for developing ratio scale measures for the impact of the identified risk events. The identified risk events are associated with objectives and ratio scale measures are derived for the importance of the objectives as well as the impact of the events on the objectives. The development of the ratio scale measures for the impact of identified risk events are explained in detail in conjunction with FIG. 3, FIG. 4A to FIG. 4H of the present invention.

The step 300 is then followed by a step 400 for developing ratio scale measures for the likelihood of the identified risk events. The likelihoods of the identified risk events are measured for understanding the likelihood of the identified risk events in the defined environment. The development of the ratio scale measures for the likelihood of identified risk events are explained in detail in conjunction with FIG. 5 and FIG. 6A to FIG. 6G of the present invention.

The step 400 is then followed by a step 500 for deriving the risk of events by multiplying the ratio scale measures for impacts with the ratio scale measures for likelihoods of the identified risk events. The overall deriving of the risk events is explained in detail in conjunction with FIG. 7A and FIG. 7B of the present invention.

FIG. 2a is a screenshot showing, by way of an Example, a Web Page for showing identified risk events 22. In an exemplary embodiment of the present invention, the examples of the identified risk events 22 are Terrorists Smuggle WMD 22a, Terrorists bomb stock exchange bonding 22b, Unarmed Terrorists Illegally Enter US to Commit a Violent Act 22c etc. The risk events 22 may be identified by various known methods such as brainstorming, surveys, interviews, working groups, experiential knowledge, documented knowledge, risk trigger questions, lessons learned, output from risk-oriented analysis, historical information and engineering templates.

In a preferred embodiment of the present invention, visual brainstorming 24 is used to identify the risk events 22. The visual brainstorming 24 is a process for developing creative solutions to problems on a visual platform. The visual brainstorming 24 may be done through Individually 26 or as a Team (TeamTime) 30. Individuals are invited to a meeting beforehand 28. The Individual 26 allows visual brainstorming by a single person. The Invite 28 allows inviting of another person for visual brainstorming 24 to identify risk events 22. The Invite 28 is explained in detailed in conjunction with FIG. 2B of the present invention. The TeamTime 30 provides a platform to a team for visual brainstorming 24. The TeamTime 30 is explained in detail in conjunction with FIG. 2C of the present invention.

Figure 2C:
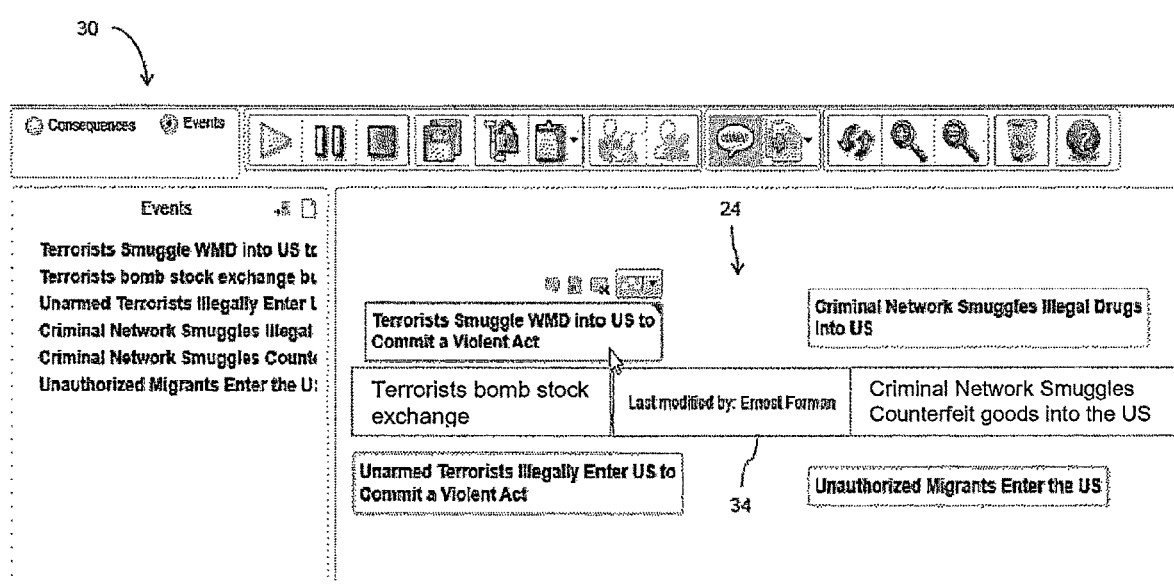
FIG. 2c is a screenshot showing, by way of an Example, a Web Page for showing TeamTime for team brainstorming of risk events.

FIG. 2B is a screenshot showing, by way of an Example, a Web Page for inviting to a TeamTime (explained through FIG. 2C) through Invite 28. The Invite 28 allows sending of a meeting request to another person to join TeamTime (explained through FIG. 2C). In a preferred embodiment of the present invention, the Invite 28 include a meeting ID 30 for providing an identification code to another person to join as a team for brainstorming. In another preferred embodiment of the present invention, the Invite 28 may further include a meeting password 32 that allows setting of a password for brainstorming through the TeamTime (explained in FIG. 2C)

FIG. 2C is a screenshot showing, by way of an Example, a Web Page for showing TeamTime 30 for team brainstorming. In an exemplary embodiment of the present invention, the visual brainstorming 24 is done by one or more persons. The TeamTime 30 allows the invited person to do brainstorming on the events that could be possibly a risk event. The TeamTime 30 shows a box 34 to show the name of the person who last modified the risk event.

Figure 3:
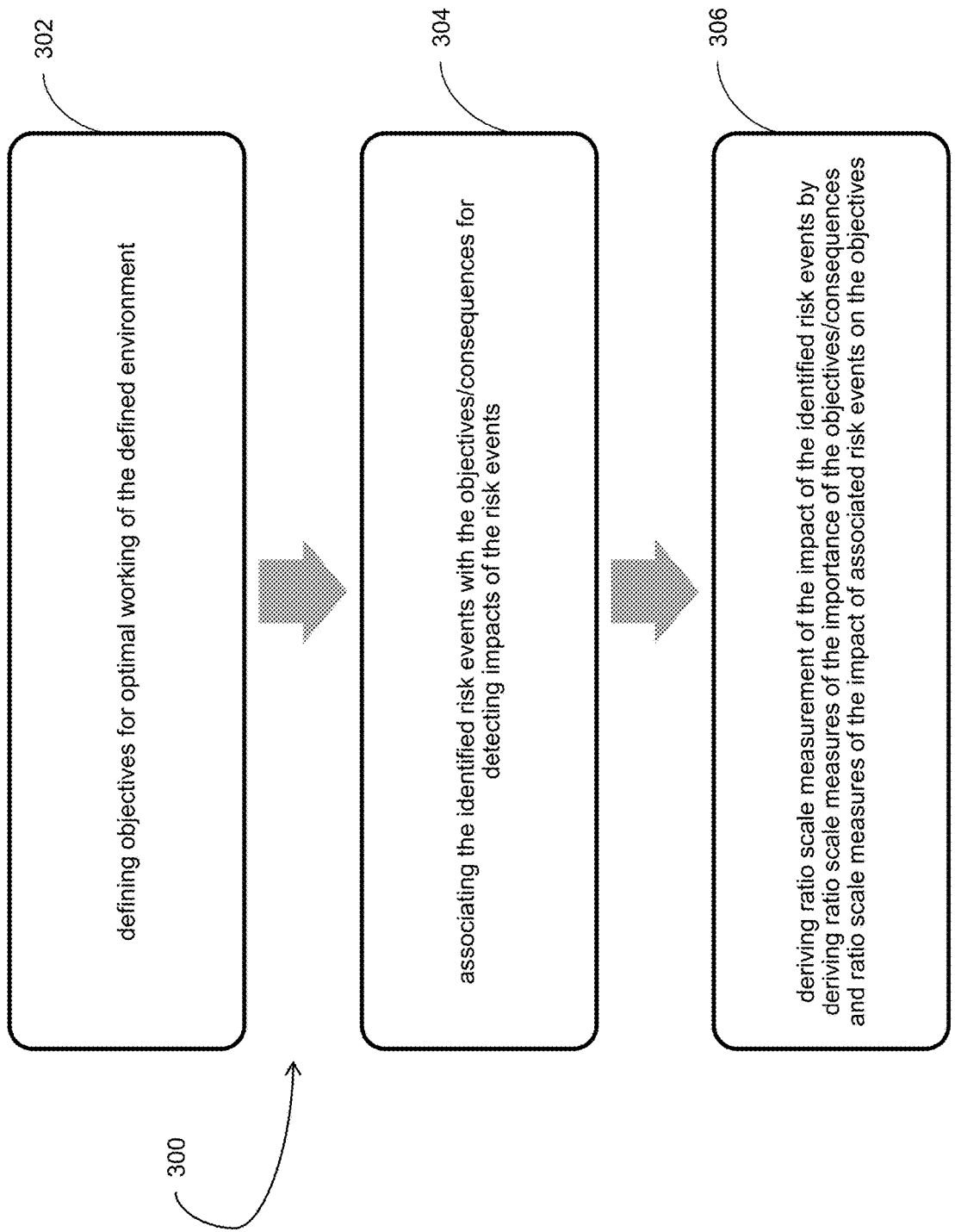
FIG. 3 illustrates a flowchart of a method for deriving the ratio scale measurement of the impacts of the identified risk events in accordance with a preferred embodiment of the present invention.

FIG. 3 illustrates a flowchart of a method 300 for deriving the ratio scale measurement of the impacts of the identified risk events in accordance with a preferred embodiment of the present invention. The method 300 initiates with a step 302 defining objectives/consequences for optimal working of the defined environment. The exemplary objectives for optimal working of the defined environment includes but not limited to loss of life, economic crises, loss of confidence etc.

The step 302 is then followed by a step 304 to associate the identified risk events with the defined objectives/consequences for detecting impacts of the identified risk events. An example of the association of the identified risk events with defined objectives is explained in FIG. 4A of the present invention. The step 304 is then followed by a step of 306 for deriving ratio scale measurement of the impact of the identified risk events by deriving the ratio scale measurement of the impacts of identified risk events by the sum-product of the ratio scale measures of the importance of the objectives and ratio scale measures of the impact of associated risk events on the objectives. The deriving of ratio scale measurement is explained in detail in conjunction with FIG. 4B to FIG. 4H of the present invention.

Figure 4A:
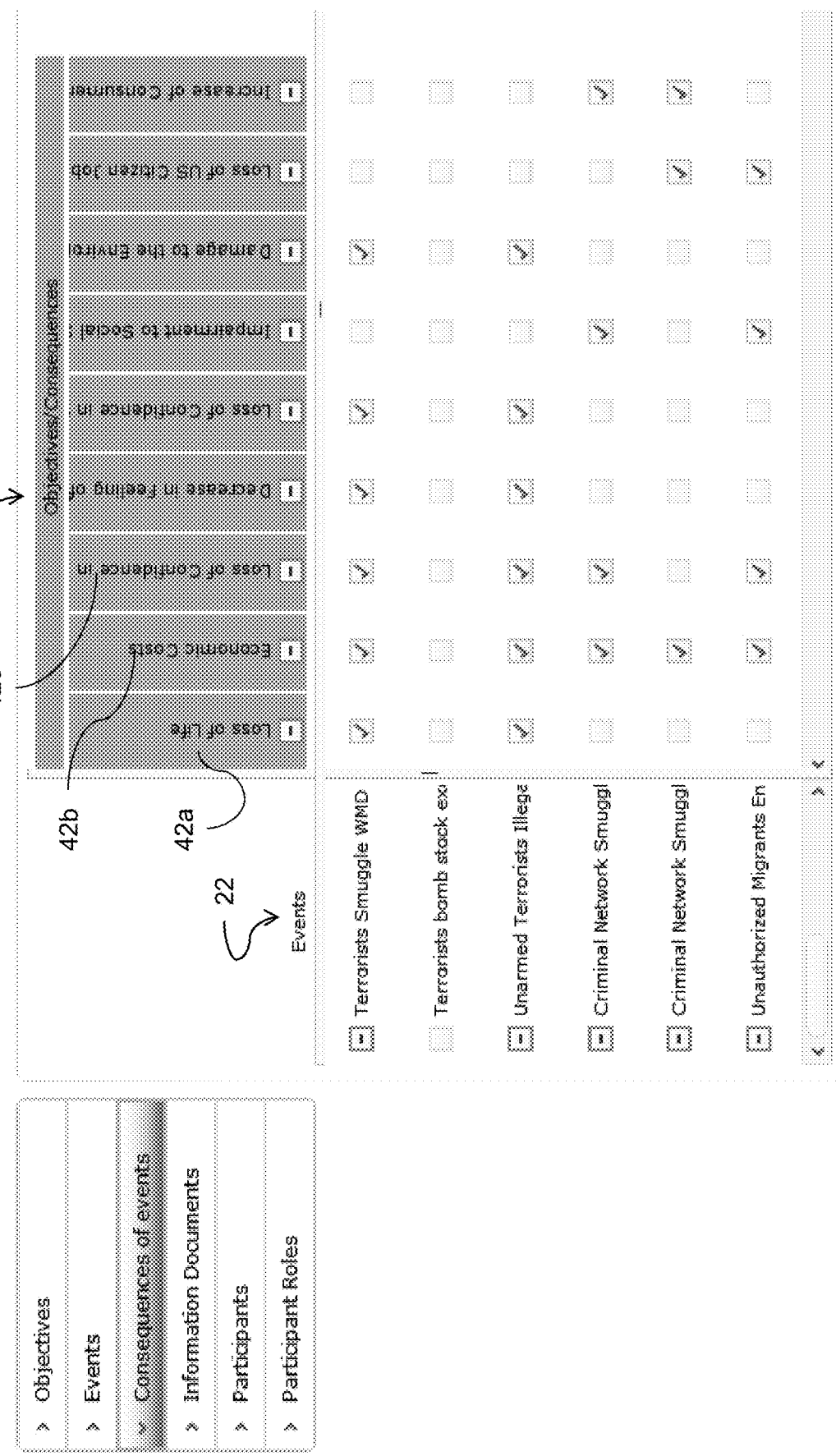
FIG. 4A is a screenshot showing, by way of an Example, a Web Page for associating the identified risk events with the defined objectives.

FIG. 4A is a screenshot showing, by way of an Example, a Web Page for associating the identified risk with the defined objectives/consequences 42. The identified risk events 22 are associated with the defined objectives 42 for detecting the impacts of the identified risk events 22. Examples of the defined objectives/consequences 42 include but not limited to Loss of Life 42a, Economic Costs 42b, Loss of confidence 42c etc. This association then helps in deriving ratio scale measurement and is explained through FIG. 4B to FIG. 4H of the present invention.

Figure 4B:
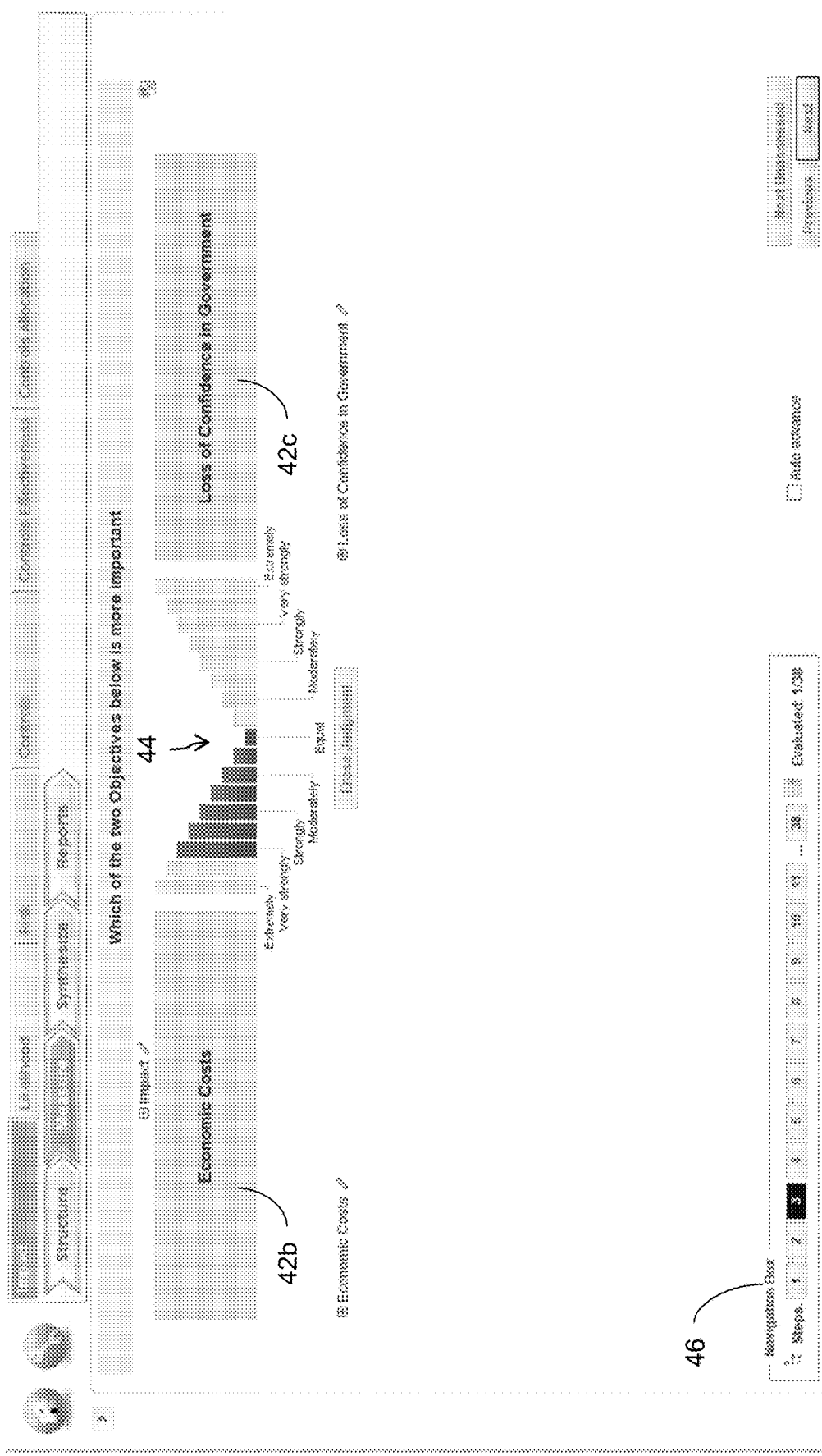
FIG. 4B is a screenshot showing, by way of an Example, a Web Page for deriving ratio scale measures of the importance of the objectives by eliciting pairwise verbal comparisons.

FIG. 4B is a screenshot showing, by way of an Example, a Web Page for deriving ratio scale measures of the importance of the objectives by eliciting pairwise verbal comparisons. In a preferred embodiment of the present invention, the relative importance of two objectives/consequences 42 such as Economic Costs 42b and Loss of Confidence in Government 42c in the defined environment is specified through a pairwise comparison 44. The pairwise comparison 44 is made to indicate which of the two objective/consequences 42 is more important and by how much. The pairwise comparison 44 is divided into verbal intensities of equal, moderately, strongly, very strongly and extremely or in between.

A series of pairwise comparisons between each objective/consequence in a cluster and all others in the cluster are performed. An eigenvector computation is performed and the priorities of the objectives/consequences determined by the normalized principle right hand eigenvector. In another exemplary embodiment, a navigation box 46 provides the ability to jump to different steps in the process.

FIG. 4C is a screenshot showing, by way of an Example, a Web Page for displaying the results for importance of objectives/consequences 42. The exemplary web page allows showing of the importance of losses (consequences to objectives) and provides an opportunity to change the priorities if they are not reasonable through the box 48.

FIG. 4D is a screenshot showing, by way of an Example, a Web Page for selecting a method to use to evaluate the impact of the risk events on an objective 42. In exemplary embodiment the objectives/consequences 42 may be measured through various options under measurement type 44 such as pairwise comparison, rating scale, simple utility curve, direct priority input and step function ascending.

Figure 4E:
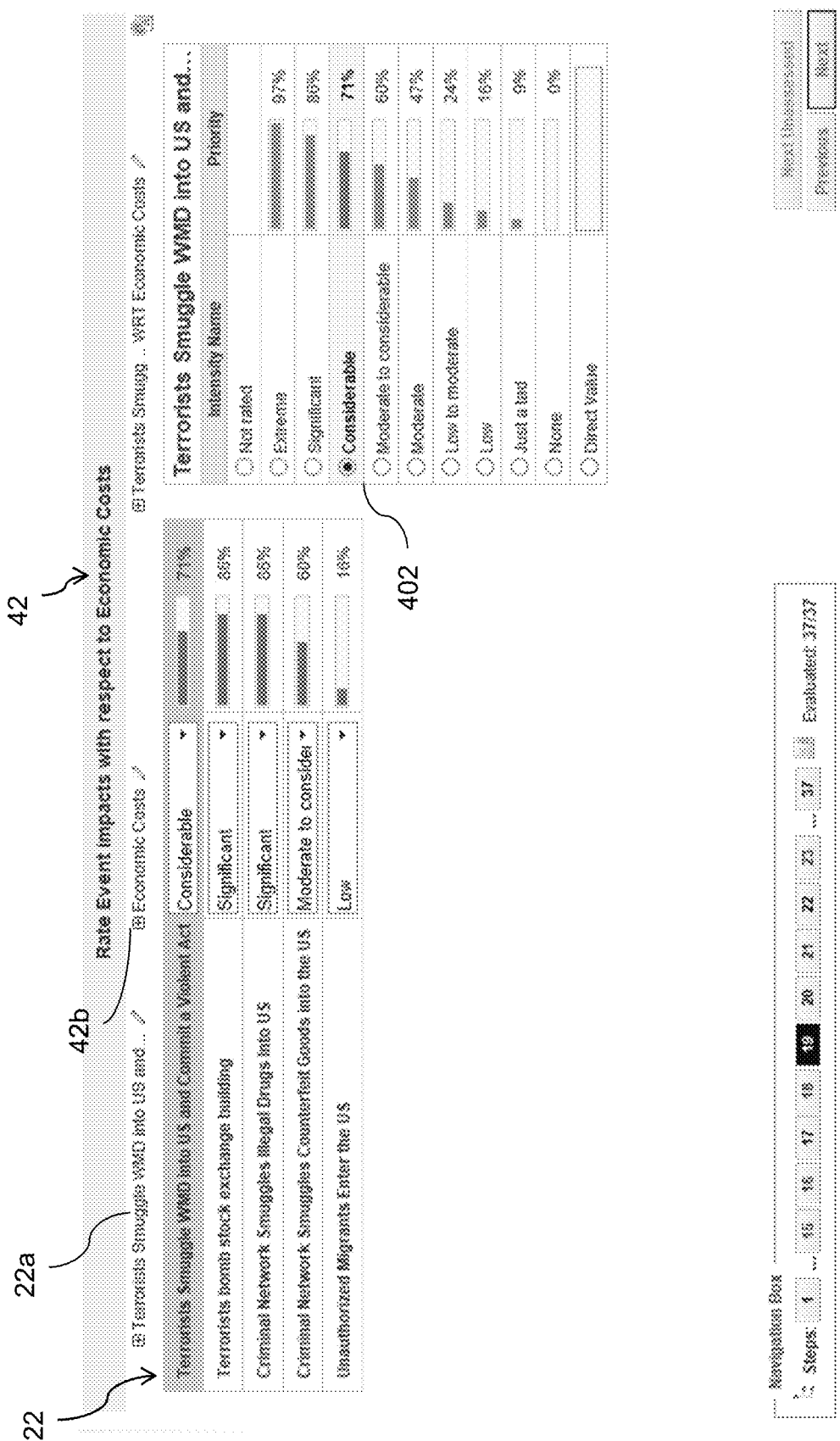
FIG. 4E is a screenshot showing, by way of an Example, a Web Page for rating the impact of the risk events on an objective using ratio scaled rating intensity priorities.

FIG. 4E is a screenshot showing, by way of an Example, a Web Page for rating the impact of the risk events 22 on one the objectives/consequences 42. Herein for the exemplary embodiment of the present invention, the risk events 22 are rated with respect to the objectives 42 such as Economic Cost 42b. In an exemplary embodiment, the rating of the risk event of Terrorist Smuggle WMD with respect to Economic cost 42a is Considerable at 71%.

In another exemplary embodiment, a table 402 shows the rating scale of Intensity Names and their ratio scale priorities. For example, the risk event 22 such as Terrorist Smuggle WMD . . . 22a with respect to Economic cost 42a is Considerable at 71%. Similarly, the impact of other risk events 22 such as Criminal Network Smuggles Illegal Drugs Into US is Significant i.e. 86%. The rating of each risk event 22 with respect to the each of the objectives/consequences 42 provides the ratio scale measurement of the impact of each risk events 22 in the predefined environment.

Figure 4F:
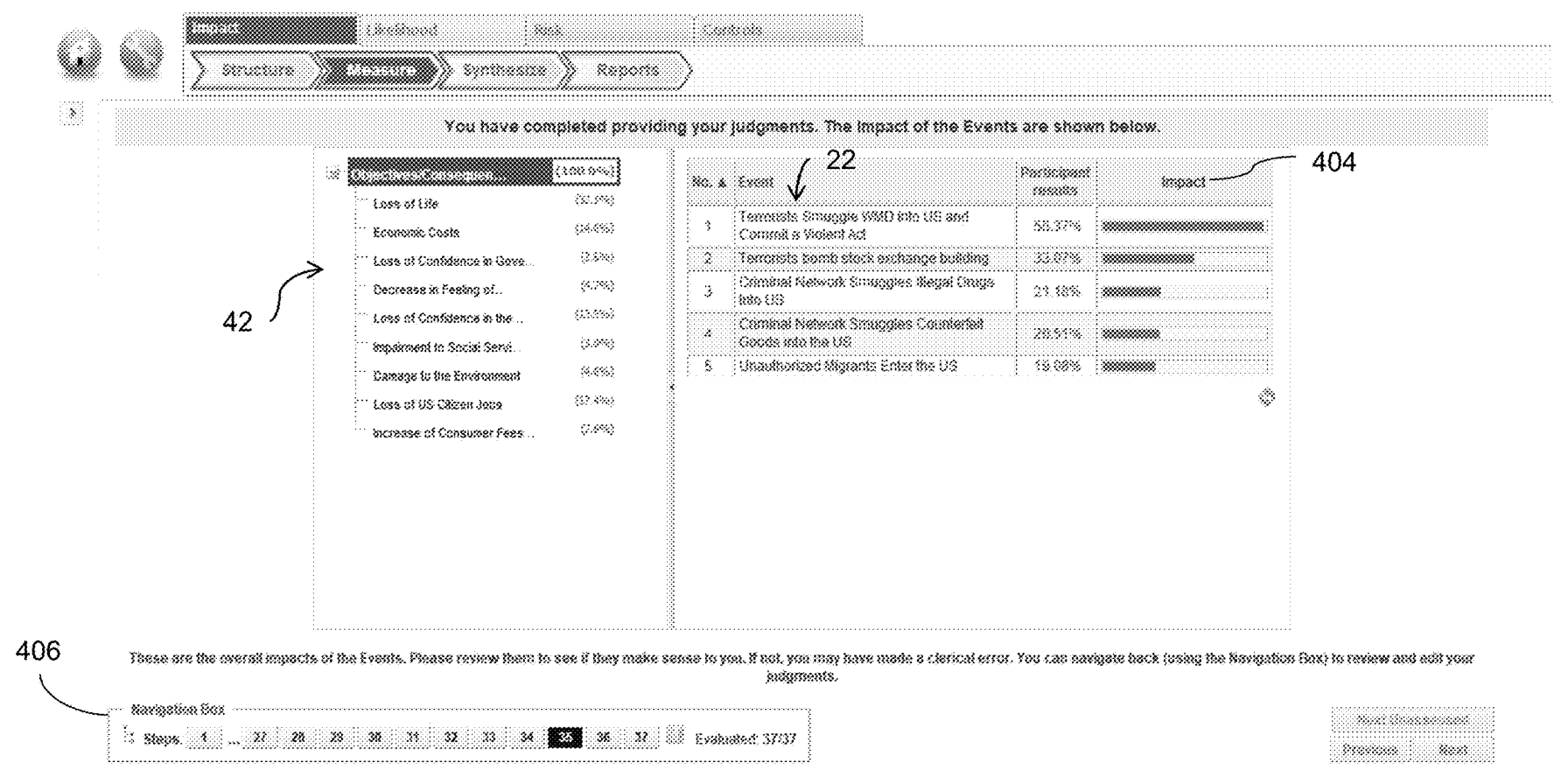

FIG. 4F is a screenshot showing, by way of an Example, a Web Page for showing overall risk event impacts. In the exemplary embodiment of the present invention, Impact 404 of each of the risk event 22 is provided. Further, the Navigation Box 406 allows navigation of pages to review and edit judgments. The impact of the risk events 22 is the sum-product of the impact of the risk events 22 on objectives/consequences 42 and the importance/priorities of the objectives 42. The sum-product for deriving impact of the risk event is explained in detail in conjunction with FIG. 4h of the present invention.

Figure 4G:
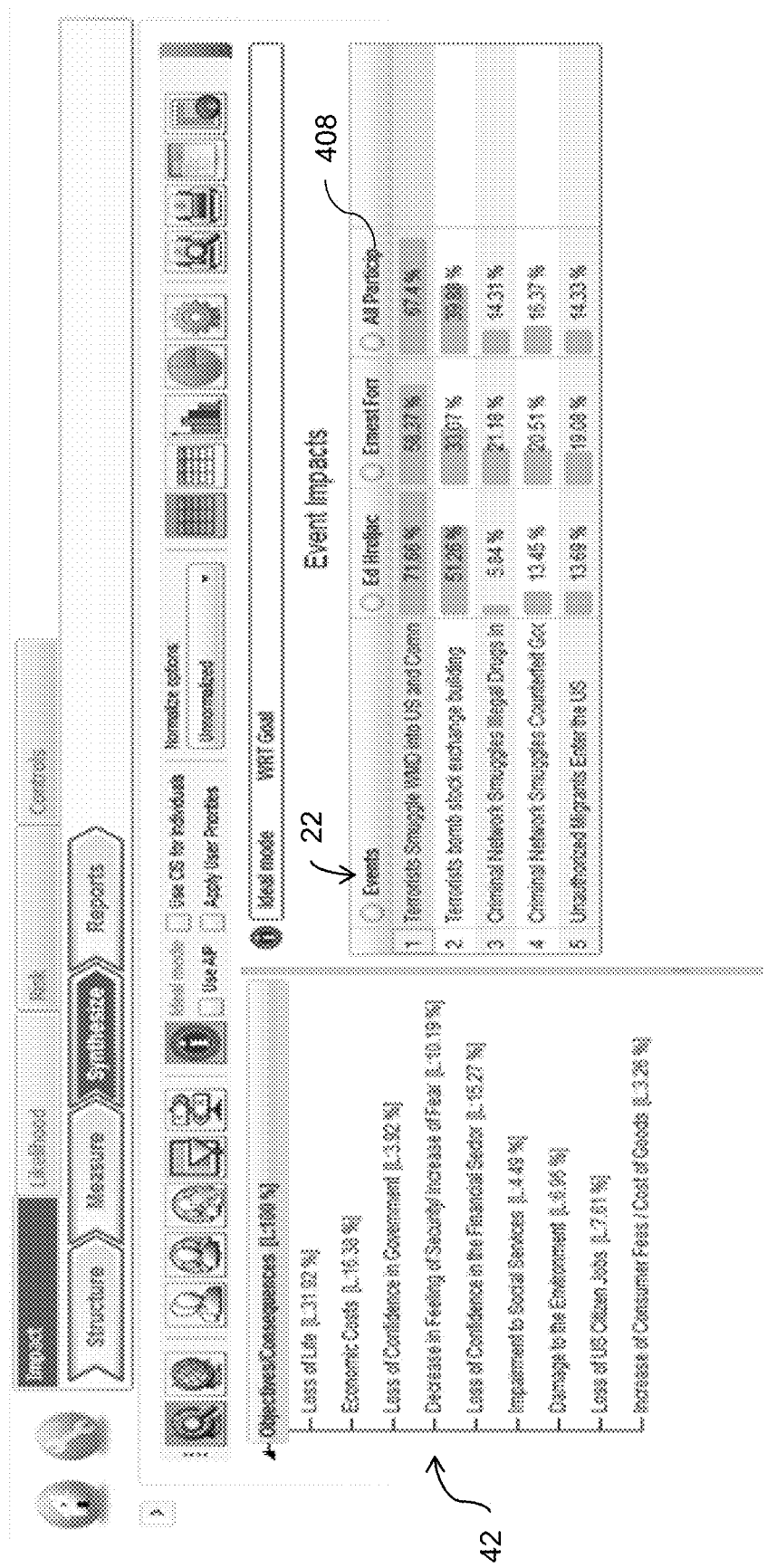
FIG. 4G is a screenshot showing, by way of another Example, a Web Page for overall event impacts in accordance with a preferred embodiment, here showing the results for two participants and for all participants.

FIG. 4G is a screenshot showing, by way of another Example, a Web Page for overall event impacts. The impacts of each risk event 22 are shown for all participants 408 with respect to consequences/objectives 42.

FIG. 4H shows an exemplary embodiment of showing measurement of impacts for the identified risk events 22 with respect to the objectives/consequences 42. FIG. 4H (i) indicates the priorities determined by the 'All Participants' for the impact of one of the identified risk events 22a with respect to the objective/consequence 42a i.e. Loss of Life. For exemplary purposes, the priority determined by 'All Participants' for the identified event 22a 'Terrorist Smuggle WMD . . . ' is 100% with respect to the objective/consequence 42a i.e. 'Loss of Life' which has a priority of 31.92%. The priorities of the impacts may be calculated by pairwise comparisons as described in FIG. 4b of the present invention.

FIG. 4H (ii) indicates the priorities determined by 'All Participants' for the impact of one of the identified risk events 22 with respect to the objective/consequence 42b i.e. Economic Costs. The impact of identified risk event 22a i.e. Terrorists Smuggle WMD . . . is 65.36% for the priority to objective/consequences 42b i.e. Economic Costs which has a priority of 16.38%. Similarly, FIG. 4H (iii) indicates the priorities determined by 'All Participants' for one of the identified risk events 22 with respect to the objective/consequence 42c i.e. Loss of Confidence in Govt. The impact of identified risk event 22a i.e. Terrorists Smuggle WMD . . . is 83.93% for the objective/consequences 42c i.e. Loss of Confidence in Govt. which has a priority of 3.92%.

Thus, for exemplary purposes the impact of the identified risk event 22a i.e. Terrorists Smuggle WMD . . . is the sum-product i.e. SUM of 0.3192×1+0.1638×0.6536+0.1019×0.9179 . . . up to the 'n' number of objectives/consequences. For exemplary purposes, suppose the hypothetical value of impact of an identified risk event 22a is 0.674021. This hypothetical value is used to calculate the risk of the identified event 'Terrorists Smuggle WMD 22a' in FIG. 7A of the present invention.

Figure 5:
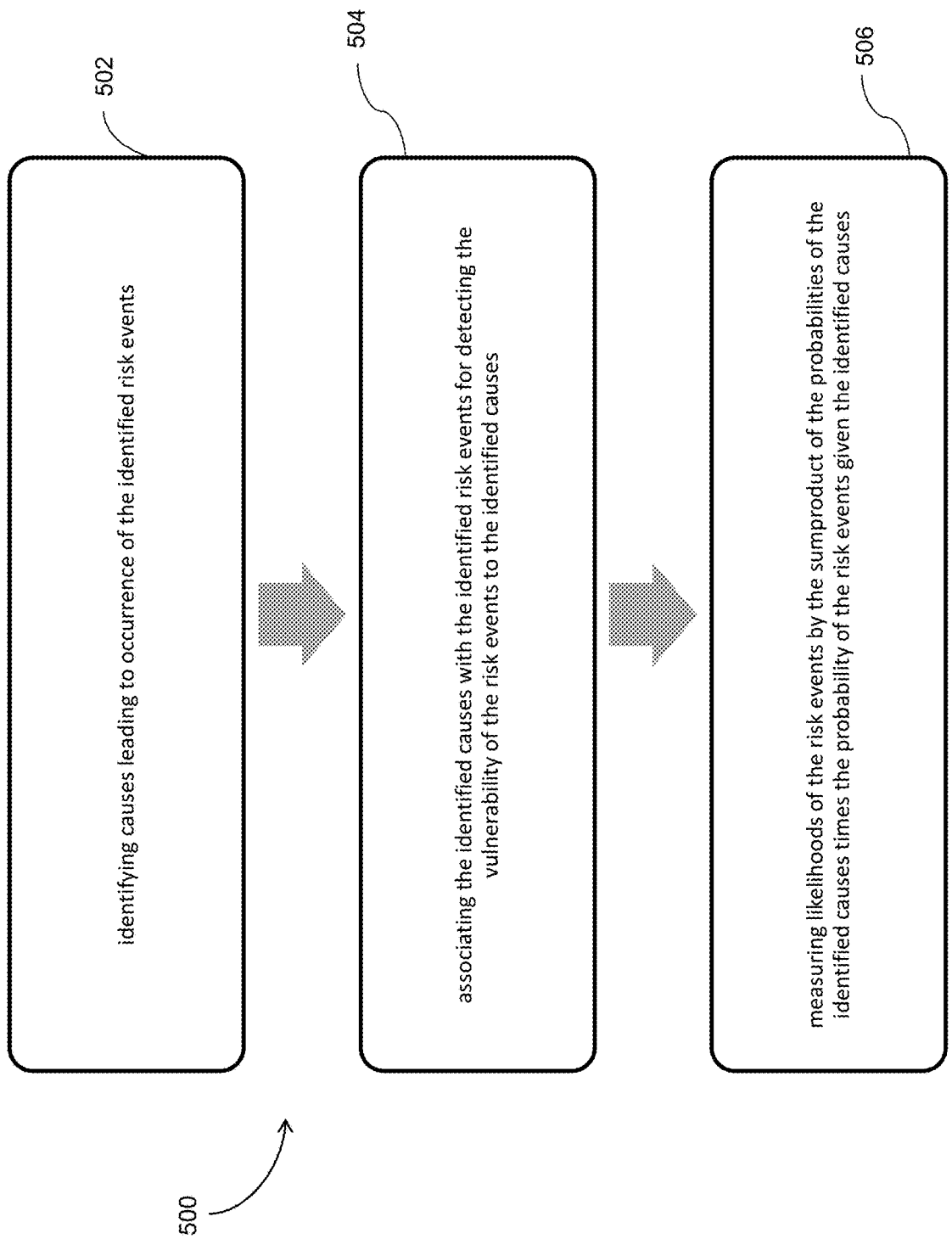
FIG. 5 illustrates a flowchart of a method for deriving the ratio scale measurement of the likelihoods of the identified risk events in accordance with a preferred embodiment of the present invention.

FIG. 5 illustrates a flowchart of a method 500 for deriving the ratio scale measurement of the likelihoods of the identified risk events in accordance with a preferred embodiment of the present invention. The method 500 includes a step 502 of identifying causes leading to occurrence of the identified risk events. In the exemplary embodiment, examples of the identified causes include but not limited to Strengthening of Terrorists cell, Lack of Intelligence Gathering and Sharing, Severe Funding Pressures etc. The step 502 is then followed by a step 504 for associating the identified causes with the identified risk events for detecting the vulnerability of the risk events to the identified causes. The association is explained in detail in conjunction with FIG. 6A of the present invention.

The step 504 is then followed by a step 506 for measuring likelihoods of the risk events by the sum-product of the probabilities of the identified causes times the probability of the risk events given the identified causes. The measurement of likelihoods is explained in detail in conjunction with FIG. 6B to FIG. 6G of the present invention.

Figure 6A:
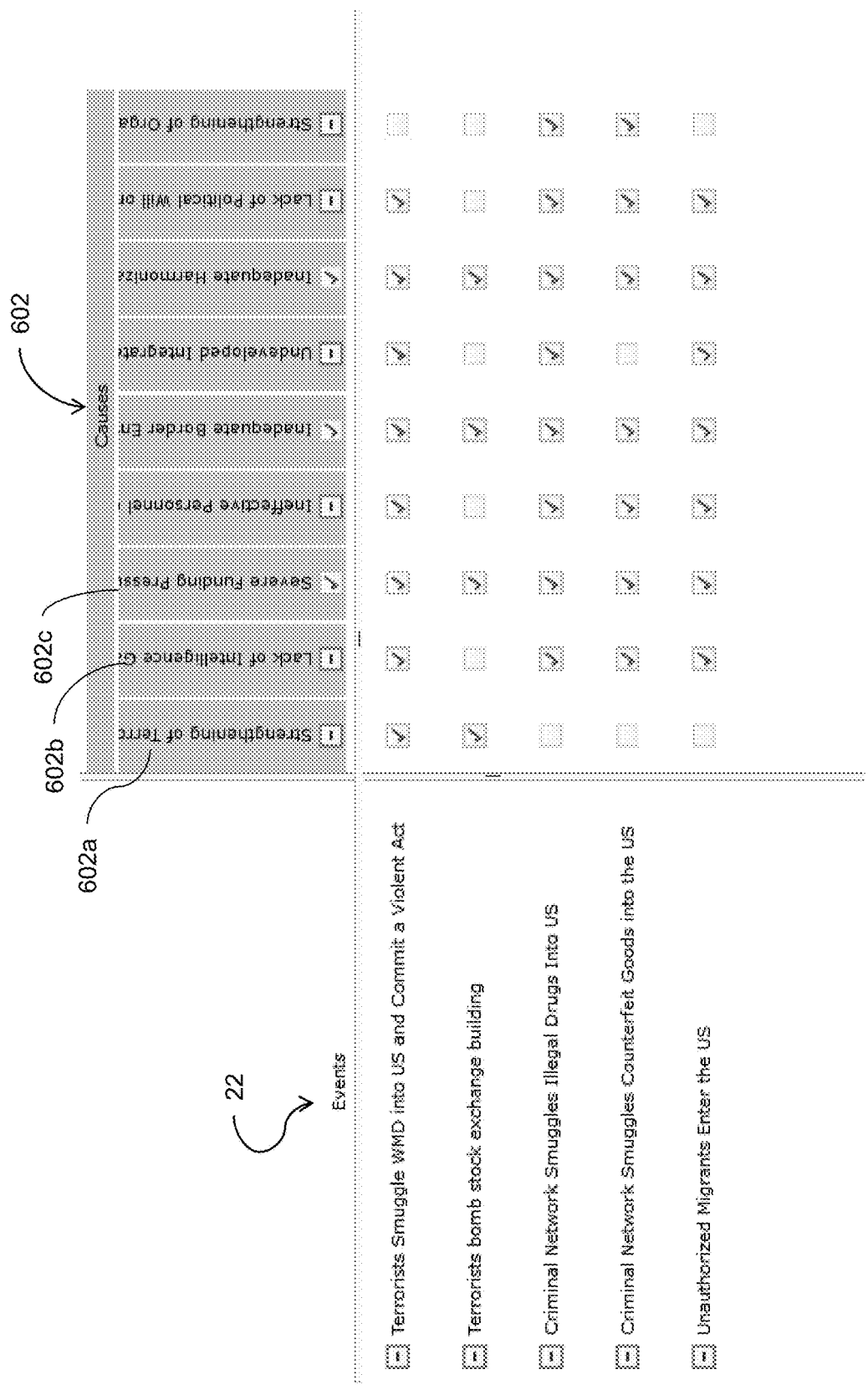
FIG. 6A is a screenshot showing, by way of another Example, a Web Page for associating the causes with the identified risk events.

FIG. 6A is a screenshot showing, by way of another Example, a Web Page for associating the identified causes 602 with the identified risk events 22. Examples of causes 602 include but not limited to Strengthening of Terrorists Cell . . . 602a, Lack of Intelligence . . . 602b, Server Funding . . . . The association is required to detect the vulnerability of the identified risk events 22 to the identified causes 602. The association then helps in measuring the likelihoods of the risk events which is explained in conjunction with FIG. 6B to FIG. 6G of the present invention.

FIG. 6B is a screenshot showing, by way of an Example, a Web Page for showing various options of measurement type 604 for measuring risk events with respect to their likelihoods. In the exemplary embodiment the causes 602 may be measured through various options under measurement type 604. Examples of options under measurement type 604 includes but not limited to such as pairwise comparison, rating scale, simple utility curve, direct priority input and step function ascending.

Figure 6C:
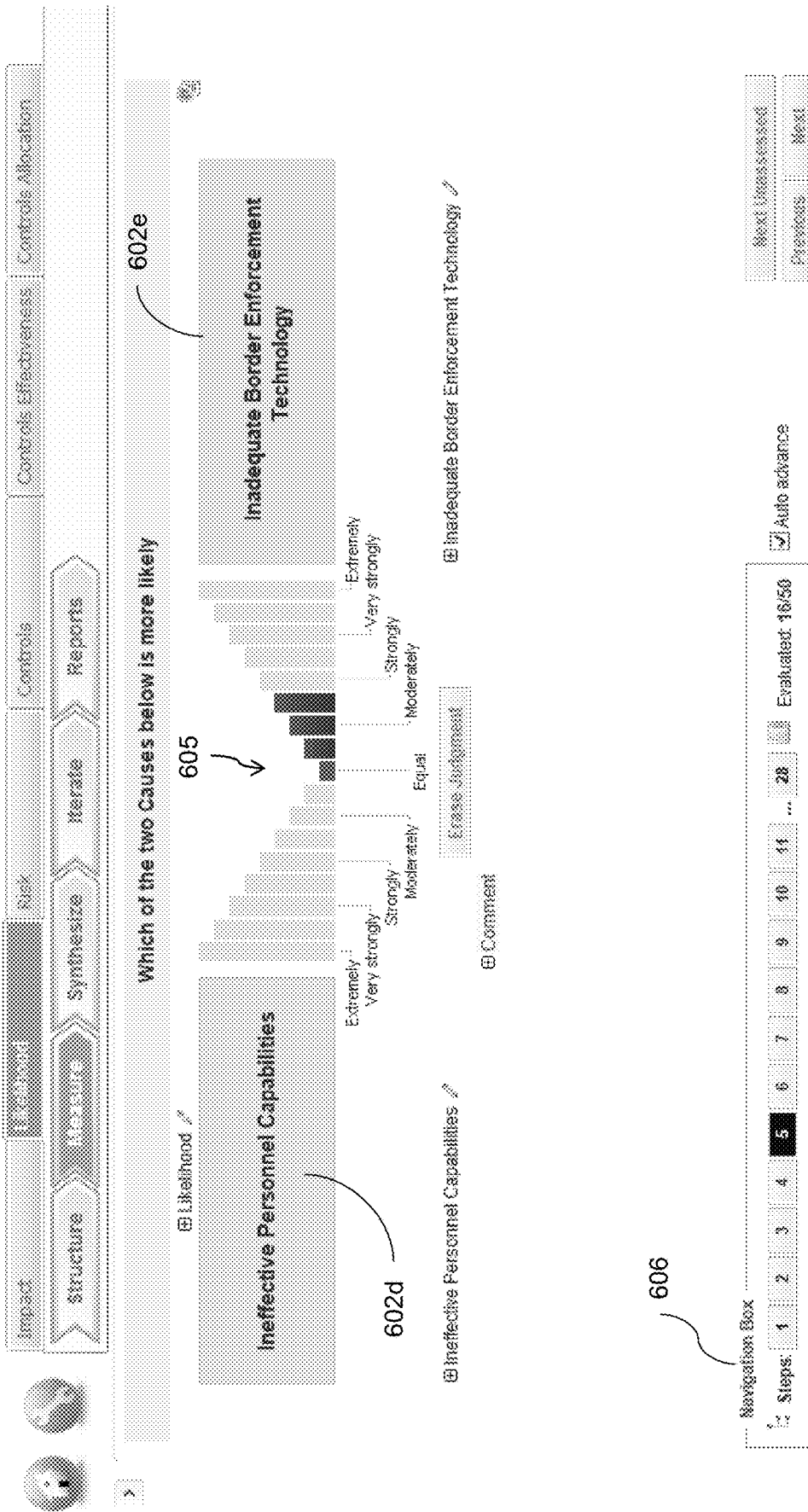
FIG. 6C is a screenshot showing, by way of Example, a Web Page for deriving ratio scale measures of the likelihood of causes by eliciting a pairwise verbal comparison.

FIG. 6C is a screenshot showing, by way of Example, a Web Page for specifying the relative likelihood of two causes 602 such as Ineffective Personal Capabilities 602d and Inadequate Border Enforcement Technology 602e. The pairwise comparison 605 is made to indicate which of the two causes 602 such as 602d and 602e is more likely to happen and by how much. The pairwise comparison 605 is divided into verbal intensities of Equal, Moderately, strongly, very strongly and extremely or in between. A series of pairwise comparisons 605 between each cause and all others is performed. An eigenvector computation is performed and the priorities of the causes determined by the normalized principle right hand eigenvector. In another exemplary embodiment, a navigation box 606 provides the ability to jump to different steps in the process.

Figure 6D:
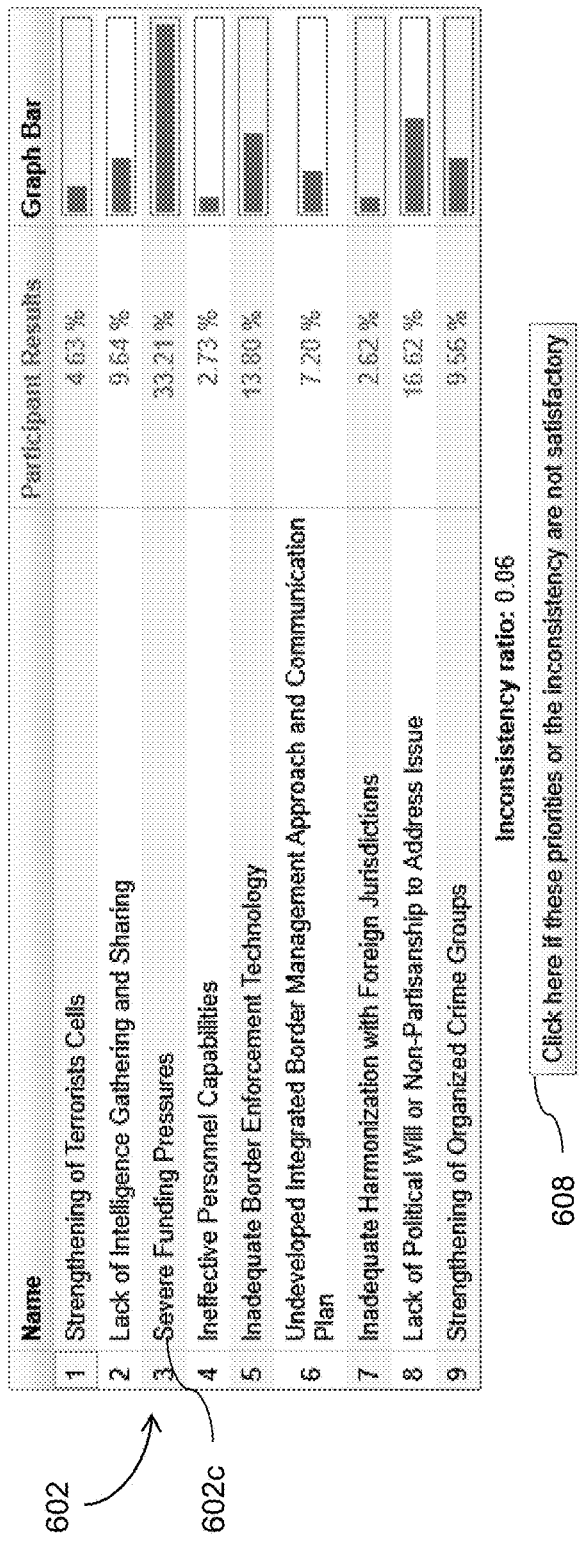
FIG. 6D is a screenshot showing, by way of an Example, a Web Page for showing the ratio scale results for the likelihood of the causes.

FIG. 6D is a screenshot showing, by way of an Example, a Web Page for showing the results for the likelihood of the causes 602. The Web Page displays the results after prioritizing the causes 602. As for the exemplary purposes, the highest priority of the causes 602 prioritized by All Participants is 33.21% is for the cause 602 i.e. severe funding pressures 602c. In another exemplary embodiment, a box 608 allows to change the priorities or the inconsistency that are not satisfactory.

Figure 6E:
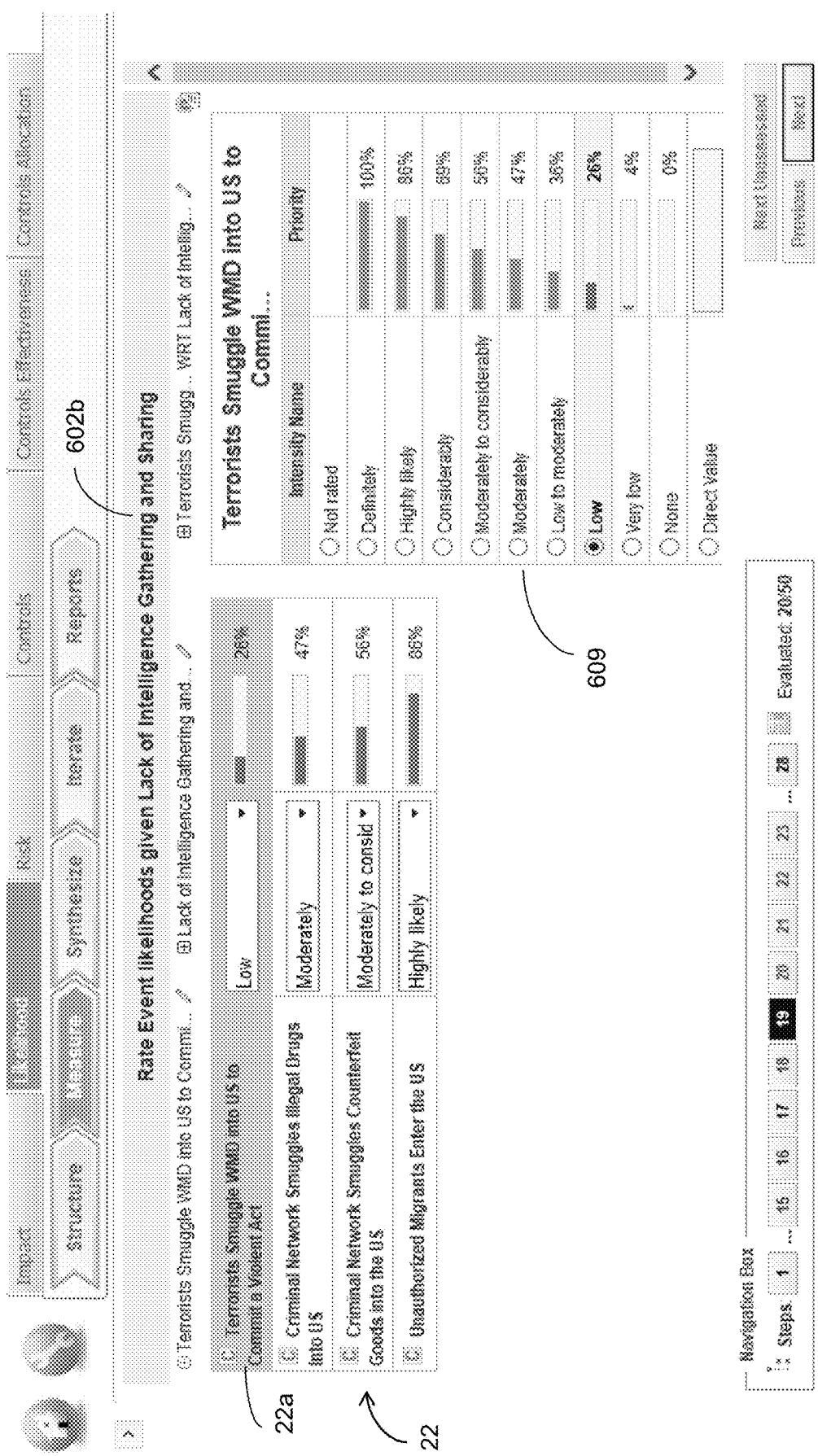
FIG. 6E is a screenshot showing, by way of an Example, for a Web Page for rating the likelihood of the risk events given a cause using ratio scaled rating intensity priorities.

FIG. 6E is a screenshot showing, by way of an Example, a Web Page for rating the likelihoods of risk events given a cause 602 such as Lack of Intelligence Gathering and Sharing 602b. Herein for exemplary purpose, the rating for the likelihood of the risk events 22a such as Terrorists smuggle WMD into US to commit a violent act for a given cause 602 such as lack of intelligence gathering and sharing 602b is Low or 26%. Similarly, for any another risk event 22 such as Criminal Network Smuggles Illegal Drugs Into US is moderately i.e. 47%. The rating of each risk event 22 for a given cause 602 provides ratio scale measurement of the likelihood of the each risk event 22 in the predefined environment.

In another exemplary embodiment, a table 609 shows the rating of risk scale of Intensity Names and their ratio scale priorities. For example, for Terrorists smuggle WMD into US to commit a violent act for given lack of intelligence gathering and sharing 602c is Low or 26%.

Figure 6F:
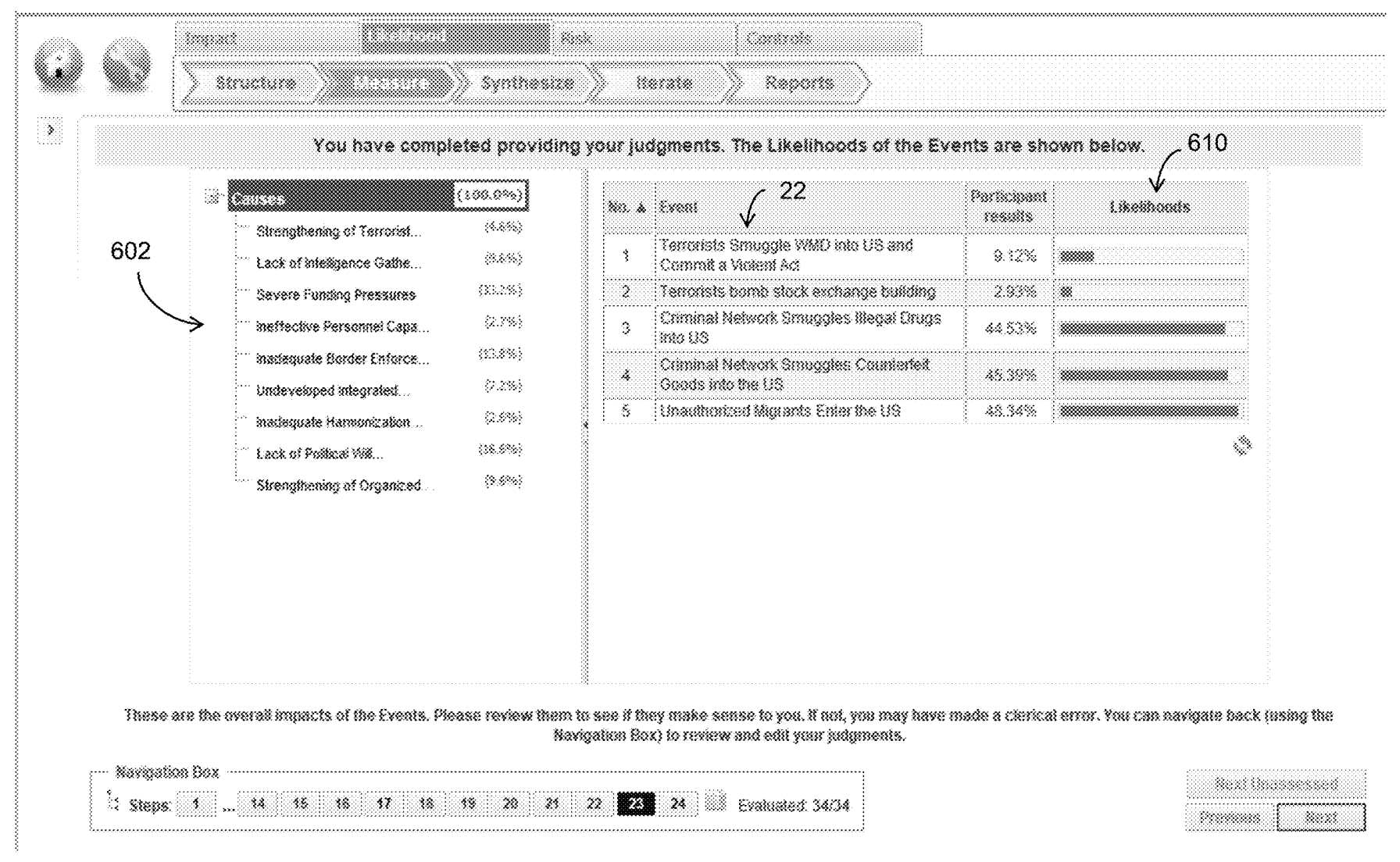

FIG. 6F is a screenshot showing, by way of an Example, a Web Page for showing the sum-product of the likelihood of causes 602 and the likelihood 610 of the risk events 22 given the causes 602. In exemplary embodiment of the present invention, the ratio scale measurement for the likelihoods 610 of the identified risk events 22 is shown. As an exemplary embodiment, the likelihoods of risk events 22 such as 'Unauthorized Migrants Enter the US' is 48.34%.

FIG. 6G shows an exemplary embodiment showing measurements of likelihoods for the identified risk events with respect to the causes in accordance with a preferred embodiment. FIG. 6G (i) indicates the priorities of the participants for one of the identified risk event 22 with respect to one of the causes 602 i.e. Strengthening of Terrorists Cells 602a. For exemplary purposes, the likelihood of the identified risk event 'Terrorist Smuggle WMD . . . 22a' is 100% with respect to the causes such as 'Strengthening of Terrorists Cells 602a' is 7.33%. The priorities of the causes 602 may be calculated by the pairwise combination method as explained in FIG. 6C of the present invention.

FIG. 6G (ii) indicates the priorities of the participants for the likelihood of one of the identified event 22 with respect to the causes 602 i.e. Lack of Intelligence Gathering and Sharing 602b. The likelihoods of identified risk event i.e. Terrorists Smuggle WMD . . . 22a is 25.9% for the priority to causes i.e. Lack of Intelligence Gathering and Sharing 602b is 8.07%.

FIG. 6G (iii) indicates the priorities of the participants for the likelihood of one of the identified event 22 with respect to the causes 602 i.e. Severe Funding Pressures 602c. The likelihoods of identified risk event 22 i.e. Terrorists Smuggle WMD . . . is 14.95% for the priority to causes 602 i.e. Lack of Intelligence Gathering and Sharing is 31.43%.

Thus, for exemplary purposes likelihood of the identified risk event 22a i.e. Terrorists Smuggle WMD . . . is the sum-product i.e. SUM of 0.0733×1+0.0807×0.259+0.3143× 0.1495 . . . up to the 'n' number of causes. For exemplary purposes, the value of likelihoods of an identified risk event 22a is 0.173481.

Figure 7A:
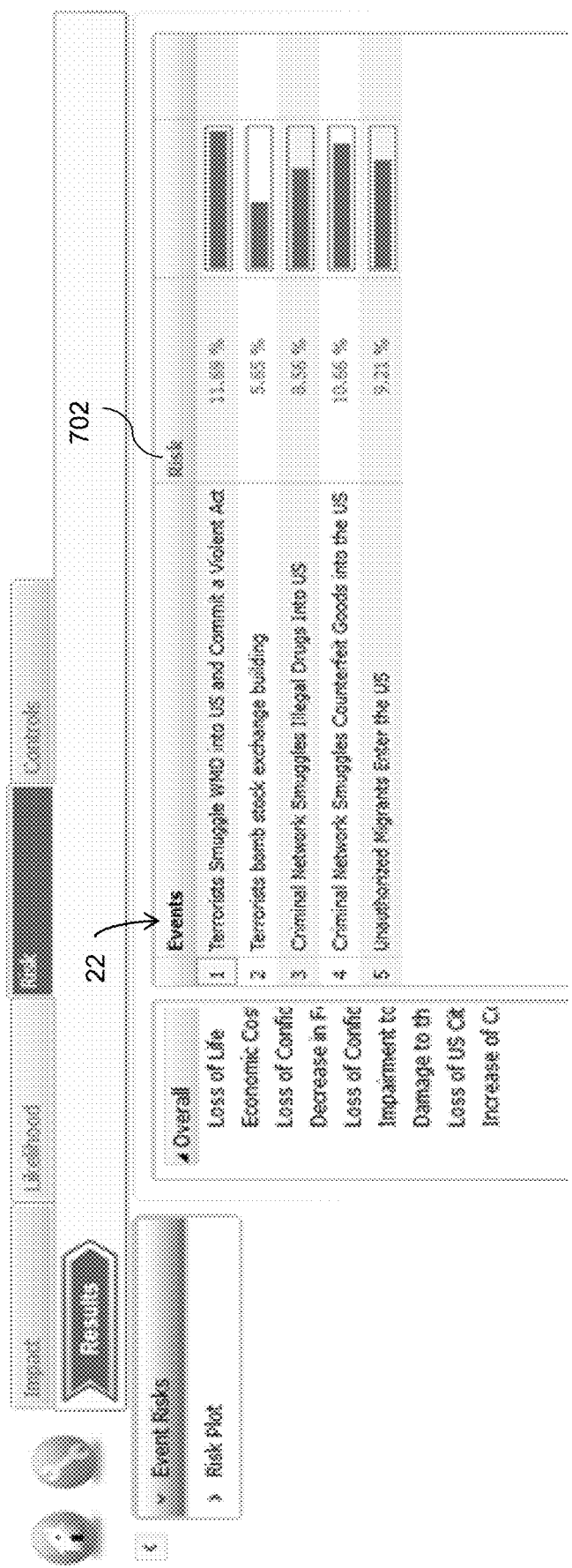
FIG. 7A is a screenshot showing, by way of an Example, a Web Page for showing ratio scale measures of the overall risk events.

FIG. 7A is a screenshot showing, by way of another Example, a Web Page for showing the overall risks of the identified risk events 22. The risk 702 is calculated by multiplying the values obtained from the ratio scale measurements of impacts of the identified risk events 22 with the values obtained from the ratio scale measurements of the likelihoods of the identified risk events 22. For exemplary purposes as shown in the FIG. 7A, the highest risk is of the occurrence for the risk event 22 i.e. Terrorists Smuggle Weapons of Mass Destruction into U.S. and Commit a Violent Act is 11.69%. Thus, risk of each of the identified risk events 22 is calculated through ratio scale measures.

As for exemplary purposes and with reference to FIG. 4H and FIG. 6G, the occurring of one of the identified risk event 22 i.e. Terrorists Smuggle WMD . . . 22a is measured through the product of the ratio scale measure of the impact of the risk event Terrorists Smuggle WMD . . . 22a (0.674021) with the ratio scale measure of the likelihood of the identified risk event Terrorists Smuggle WMD 22a (0.173481) . . . . Hence, as shown in FIG. 7A, the overall impact of the identified risk event 22a i.e. Terrorists Smuggle WMD . . . is 11.69% (0.674021×0.173481).

As explain through FIG. 4 to FIG. 6, the ratio scale measurements of the impacts and the likelihoods of other identified risk events may also be calculated in the similar manner. Then as per FIG. 7 of the present invention, the risk of other identified risk events may also be calculated.

Figure 7B:
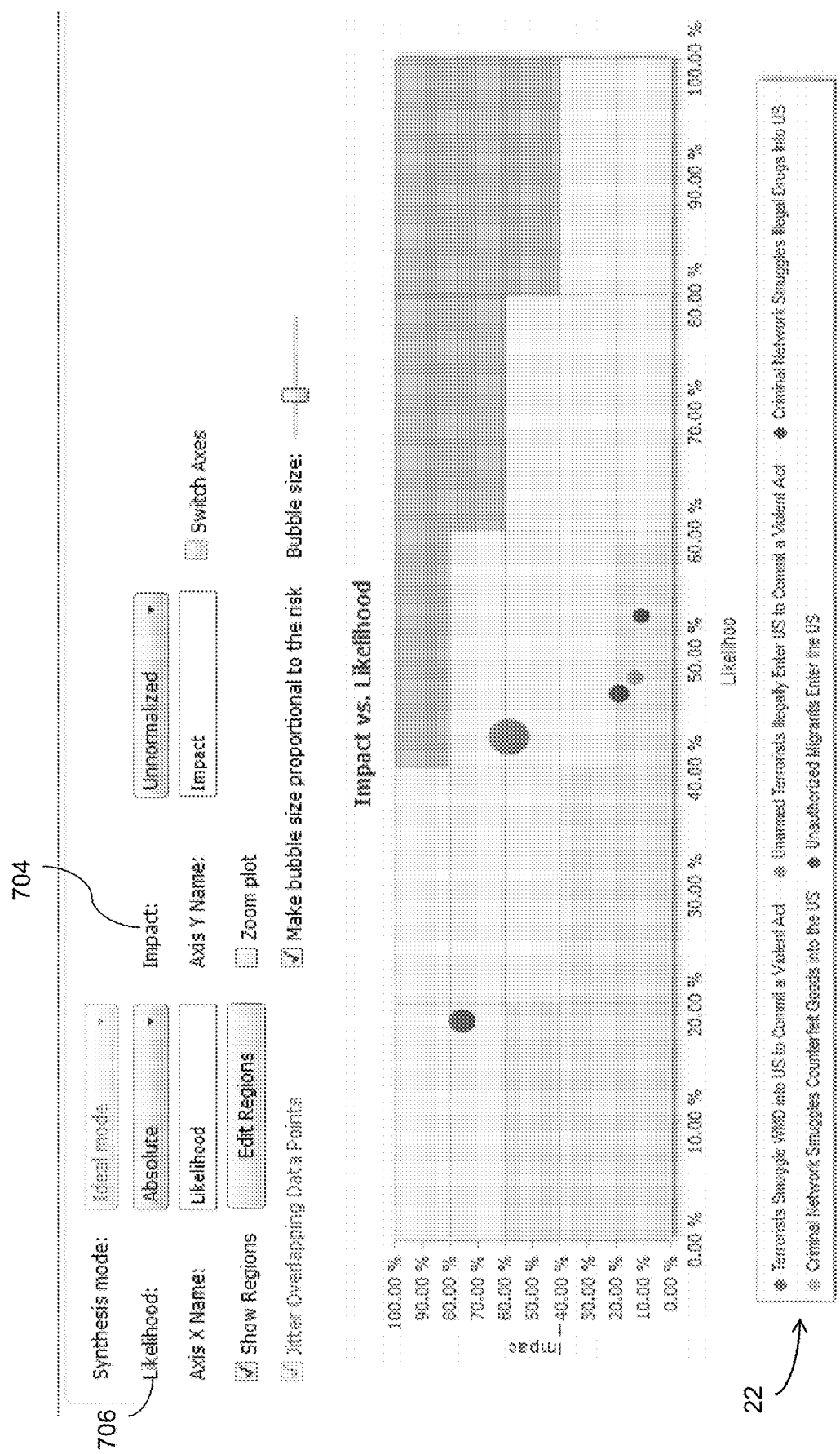
FIG. 7B is a screenshot showing, by way of an Example, a Web Page for showing a risk plot of the impact vs. likelihood of the risk events.

FIG. 7B is a screenshot showing, by way of an Example, a Web Page for showing a risk plot of the impact 704 and the likelihood 706 of the risk events 22. For exemplary purposes, the risk plot shows the risk proportional to the bubble size for the identified risk events 22.

Figure 8:
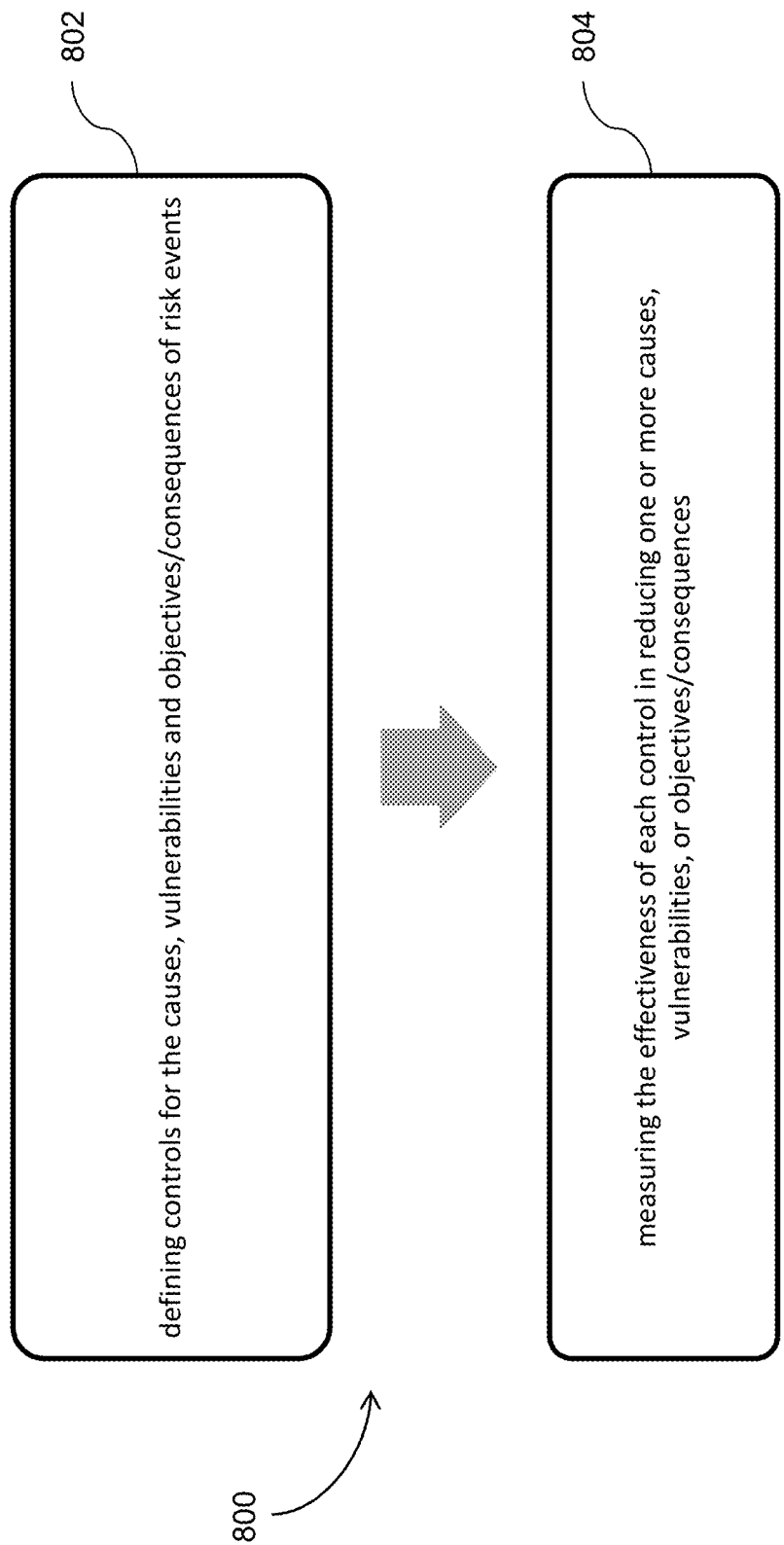
FIG. 8 illustrates a flowchart of a method for deriving control effectiveness in accordance with a preferred embodiment of the present invention.

FIG. 8 illustrates a flowchart of a method 800 for deriving control effectiveness in accordance with a preferred embodiment of the present invention. The method 800 initiates with a step 802 from defining controls for the causes, vulnerabilities and objectives/consequences of risk events. The step 802 is explained in detailed in conjunction with FIG. 8A to FIG. 8D of the present invention. The step 802 is then followed by a step 804 for measuring the effectiveness of each control in reducing one or more causes, vulnerabilities, or objectives/consequences. The measuring of the effectiveness is calculated by the ratio scale measurement. The ratio scale measurement is explained in detail in conjunction with FIG. 4 to FIG. 6 of the present invention.

Figure 8A:
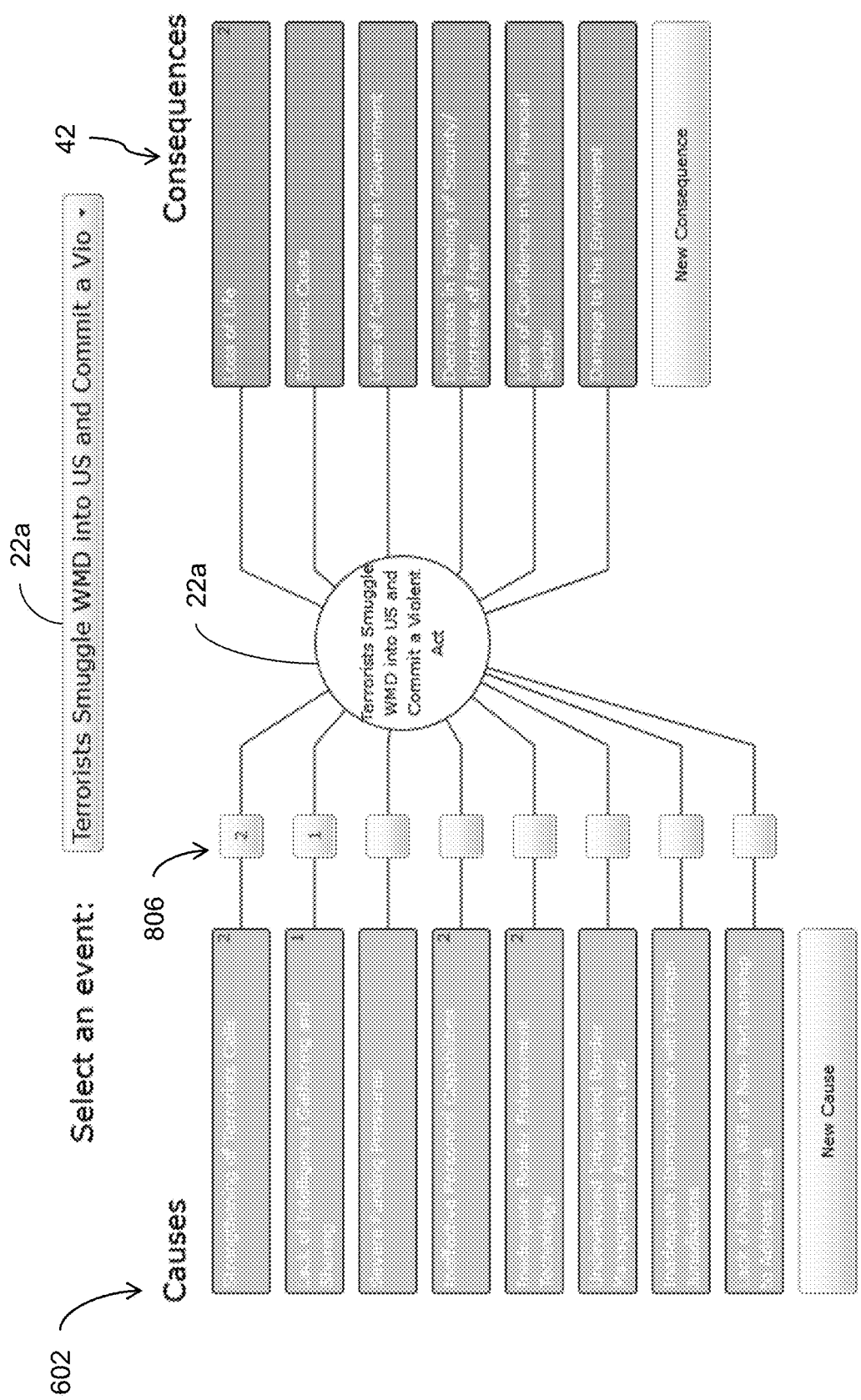
FIG. 8A is a screenshot showing, by way of an Example, a Web Page for showing a bow-tie diagram of causes and consequences with respect to one of the identified risk events.

FIG. 8A is a screenshot showing, by way of an Example, a Web Page for showing a bow-tie diagram of identified causes 602 and consequences/objectives 42 with respect to one of the identified risk event 22. In an exemplary embodiment of the present invention, controls are defined for identified causes 602, vulnerabilities 806 and objectives/consequences 42 with respect to one of the identified risk events 22. As for exemplary purposes, two controls are defined for reducing the likelihood of the identified causes 602 Strengthening of Terrorists Cells, Ineffective Personnel Capabilities and Inadequate Border Enforcement Technology and one control is defined for reducing the likelihood of Lack of Intelligence Gathering and Sharing with respect to the identified risk events 22 Terrorists Smuggle WMD into US and Commit a Violent Act.

Further, two controls are defined for the consequence/objective 22 loss of life if terrorists smuggle a WMD into US and commit a Violent Act. Similarly, controls for vulnerability 806 are also provided for Causes of terrorists smuggling a WMD into US and commit a Violent Act, 2 for the Cause Strengthening of Terrorist Cells and 1 for the Cause Lack of Intelligence Gathering and Sharing. The controls for each of the causes, vulnerabilities and consequences are explained in detail in conjunction with FIG. 8B to FIG. 8D of the present invention.

Figure 8B:
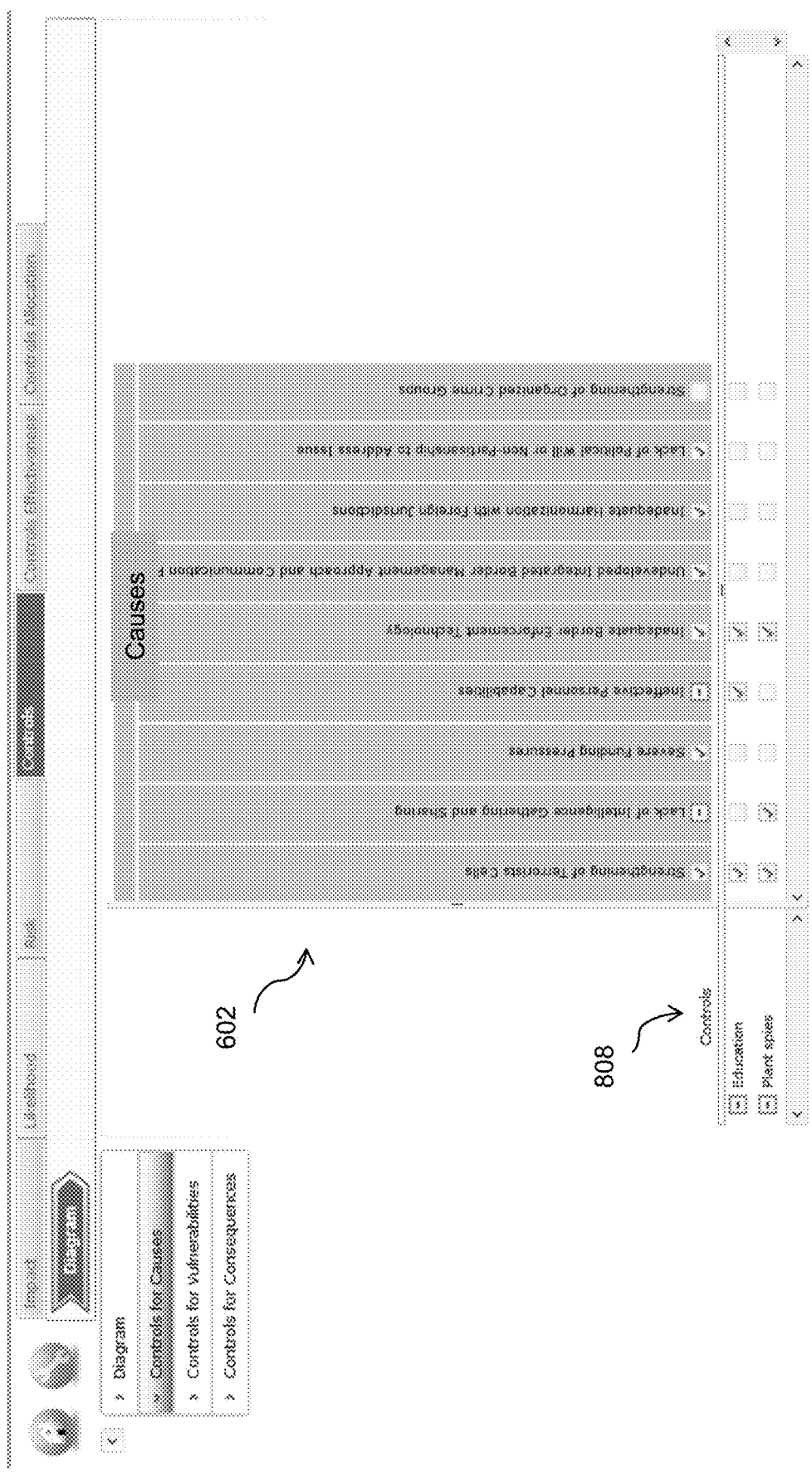
FIG. 8B is a screenshot showing, by way of an Example, a Web Page for showing the relationships of the controls with the causes.

FIG. 8B is a screenshot showing, by way of an Example, a Web Page for showing the relationships of the controls 808 with the causes 602. For exemplary embodiment, with reference to FIG. 8A of the present invention, the two controls 808 for causes 602 are Education and Plant Spies. The association is shown through the check boxes. The association then leads to measurement of effectiveness of the controls 808.

Figure 8C:
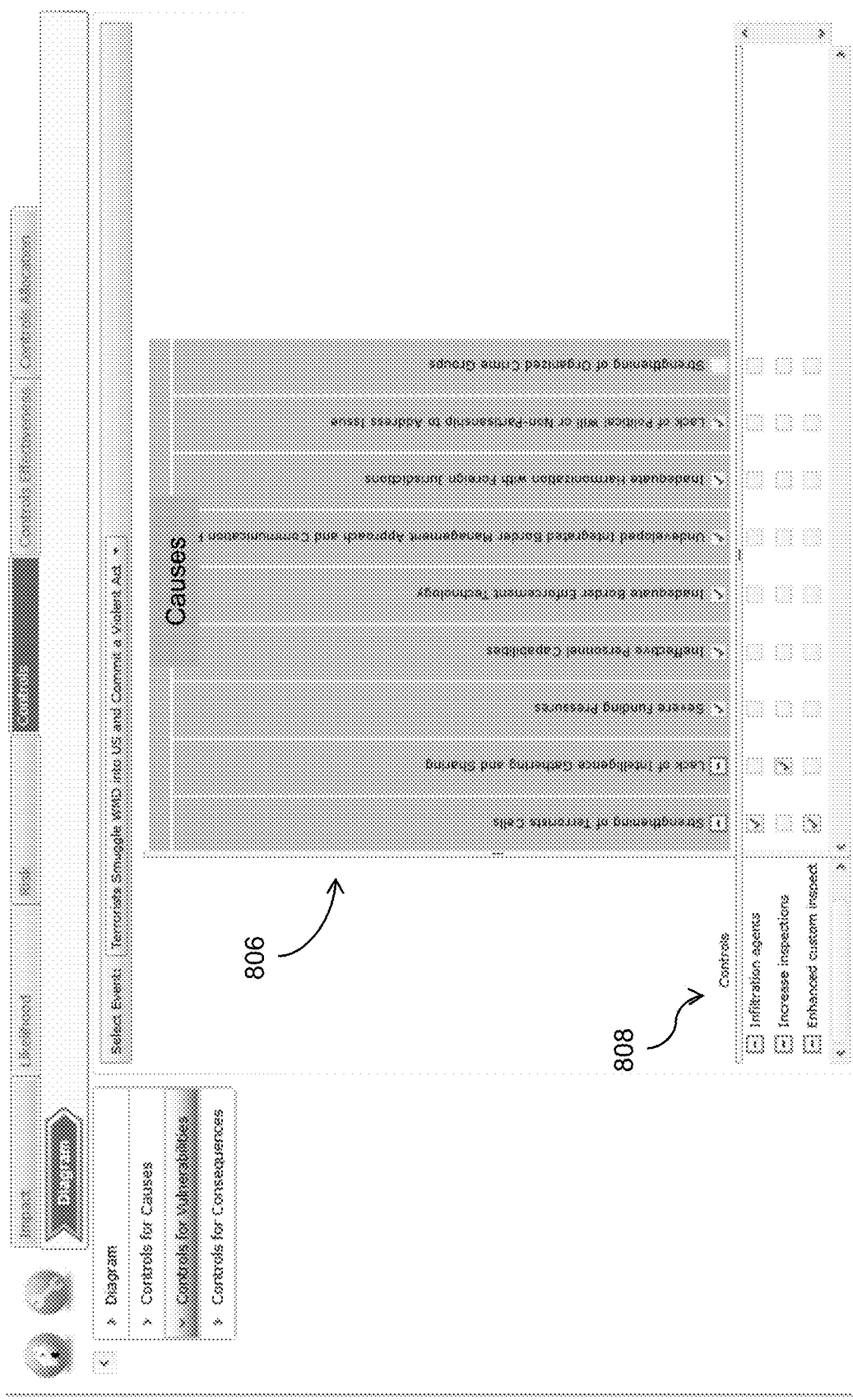
FIG. 8C is a screenshot showing, by way of an Example, a Web Page for showing the relationships of the controls with the vulnerabilities.

FIG. 8C is a screenshot showing, by way of an Example, a Web Page for showing the relationships of the controls 808 with the vulnerabilities 806. Herein for exemplary purposes, the controls 808 such as infiltration agents, increase inspections and enhanced custom inspect are associated with vulnerabilities 806 for at least one of the defined objectives/consequences 42.

Figure 8D:
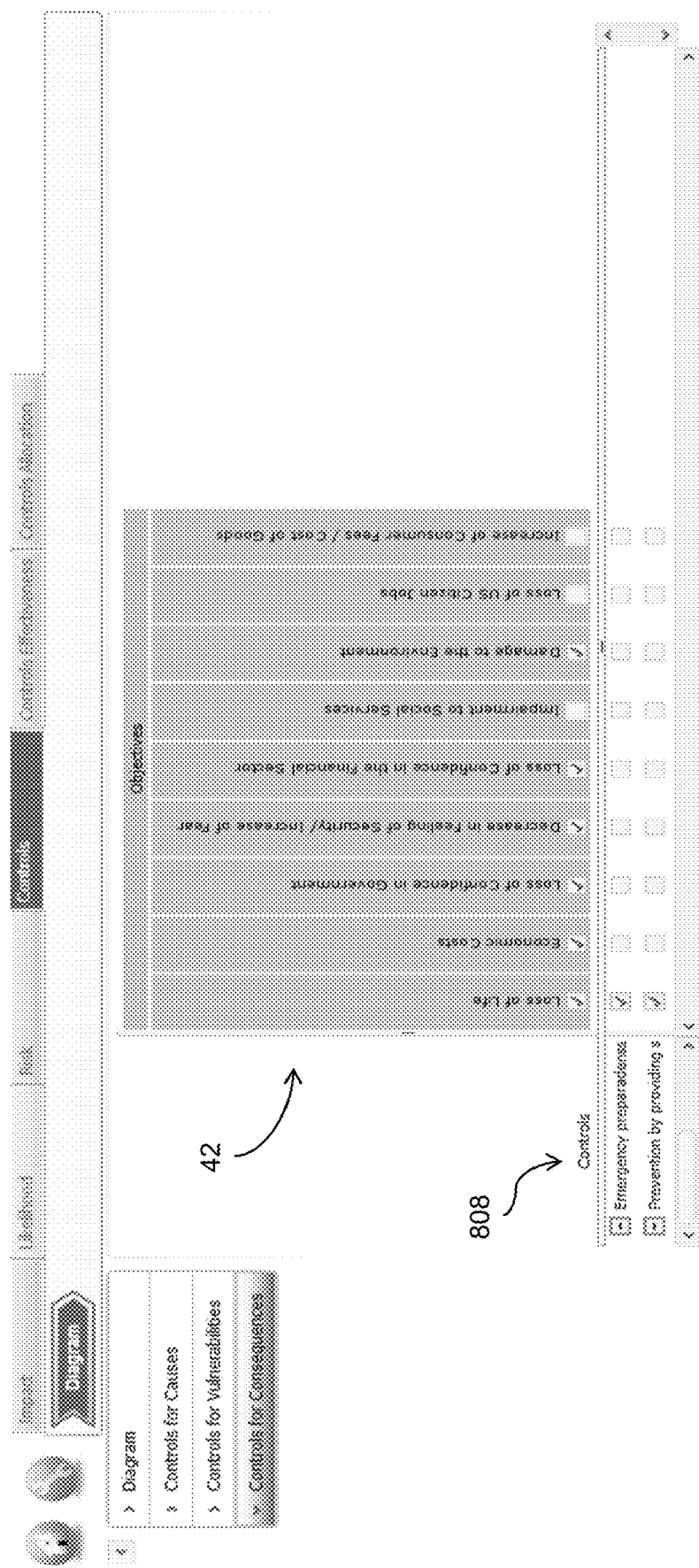
FIG. 8D is a screenshot showing, by way of an Example, a Web Page for showing the relationships of the controls with the consequences/objectives.

FIG. 8D is a screenshot showing, by way of an Example, a Web Page for showing the relationships of the controls 808 with the consequences/objectives 42. Herein for exemplary purposes, the controls 808 such as Emergency Preparations and Prevention etc are associated with the objectives/consequences 42.

FIG. 8E is a screenshot showing, by way of an Example, a Web Page for showing an exemplary method for measuring the effectiveness of controls to reduce the likelihood of two causes. Herein for exemplary embodiment, a direct priority input method 812 for assessment is shown. Other methods for measuring the effectiveness of controls are pairwise comparison, rating scale method, Simple utility curve, step function ascending etc. However, it will be readily apparent to those skilled in the art that other methods for measuring the effectiveness of controls may also be used without deviating from the scope of the present invention.

Figure 9:
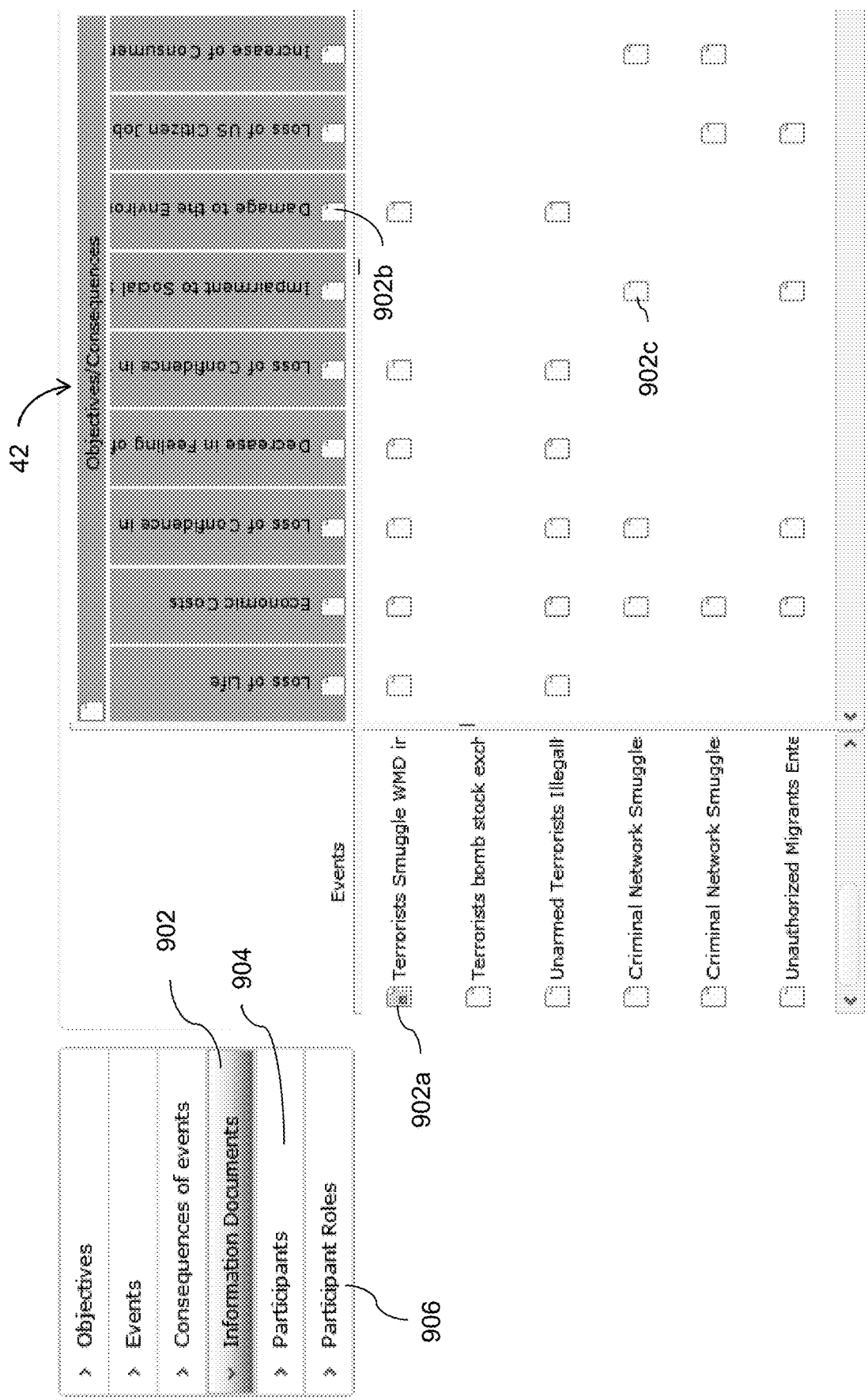
FIG. 9 is a screenshot showing, by way of an Example, a Web Page for showing the existence and navigation to Information Documents.

FIG. 9 is a screenshot showing, by way of an Example, a Web Page for showing Information Documents 902. In a preferred embodiment of the present invention, the method 100 further includes a step of gathering and presenting information relating to the risk events 22, causes 602, objectives, relationship of the risk events with causes and relationship of the risk events with the objectives and information documents 902. Herein for exemplary purposes as shown in FIG. 9, the information documents 902 such as information documents for the risk events 902a, information documents for objectives/consequences 902b and information documents for the association between the risk events 22 and the objectives/consequences 42.

In a preferred embodiment of the present invention, the information document 902a contains information for gathering and presentation. The rest of the other information document shown such as 902B and 902C are blank.

In another embodiment of the present invention is to provide an option of adding participants for assessing and mitigating risk events through Participants 904 and further allows defining of participant roles for identifying risk event, causes and objectives for measuring and reducing risk to the objectives/consequences 42 of the defined environment through Participant Roles 906.

Figure 10:
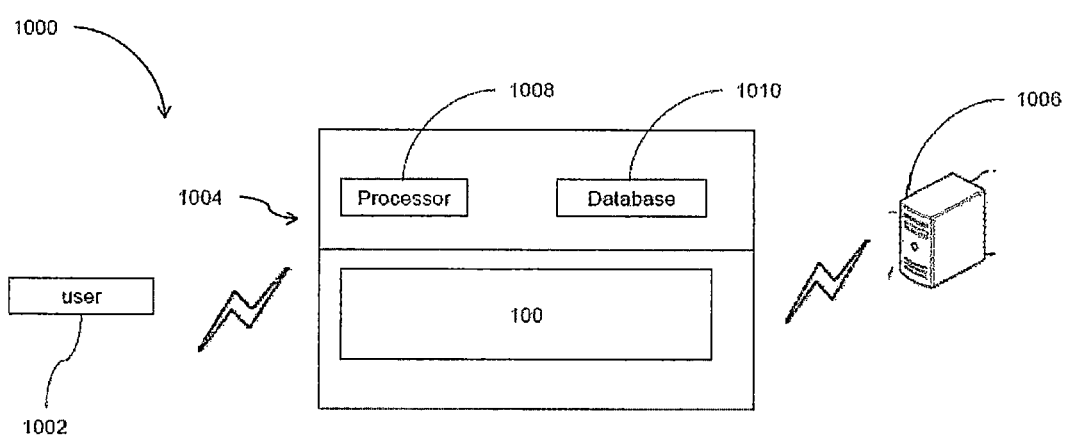
FIG. 10 is a schematic overview of the components in a network environment, in accordance with a preferred embodiment of the present invention.

FIG. 10 is a schematic overview of the components in a network environment 1000. The network 1000 includes a user 1002, a system 1004 and a communication network 1006. The system 1004 is operated by the user 1002 and communicates through the communication network 1006. The system 1004 includes a processor 1008 and a database 1010. The database 1010 stores and the processor 1008 execute the steps of the method 100. The method 100 is explained in detailed in conjunction with FIG. 1 to FIG. 9 of the present invention.

Figure 11:
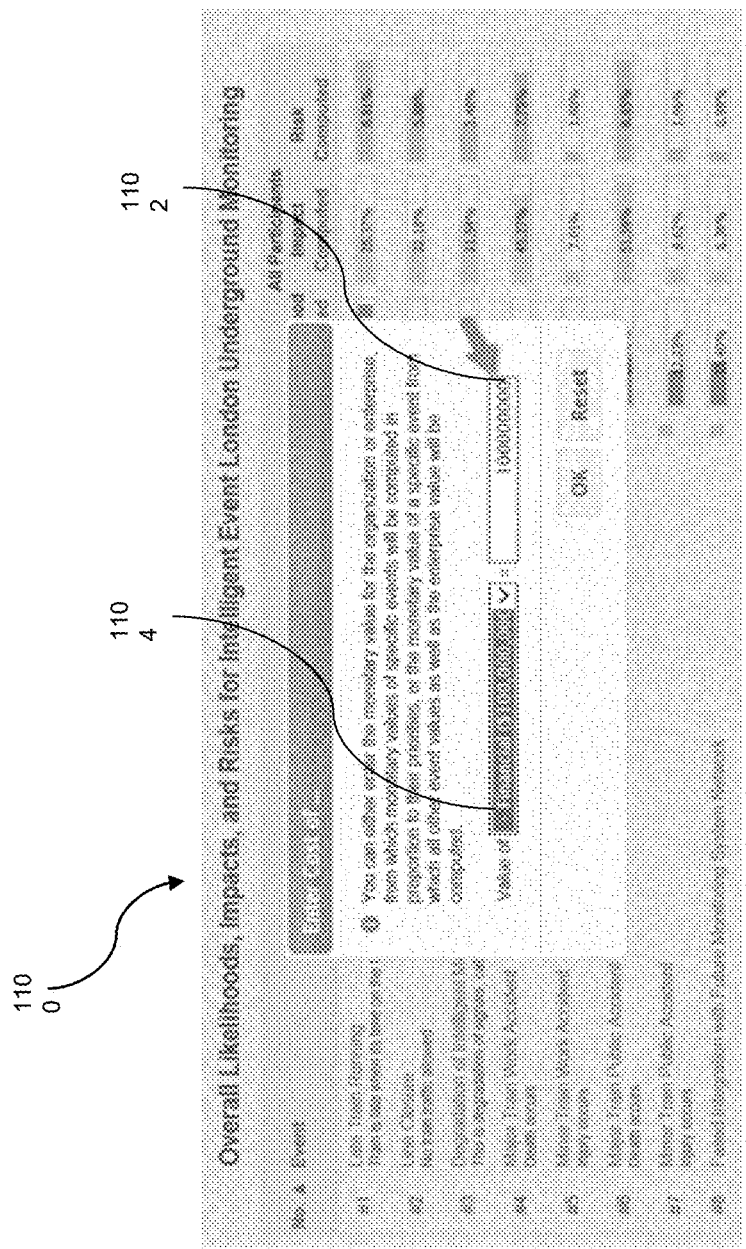
FIG. 11 is a screenshot showing, by way of an Example, a Web Page for showing receiving of estimated value of at least one of the objectives in the hierarchy.

FIG. 11 is a screenshot showing, by way of an Example, a Web Page 1100 for showing receiving of estimated monetary value of at least one of the objectives in the hierarchy. As shown in exemplary embodiment, the monetary value 1102 inputted by the user is 100000000 for the objective Financial 1104. It would be readily apparent to those skilled in the art that different types of currency such as dollar, pound, yen, rupees etc. may be envisioned without deviating from the scope of the present invention.

Figure 12:
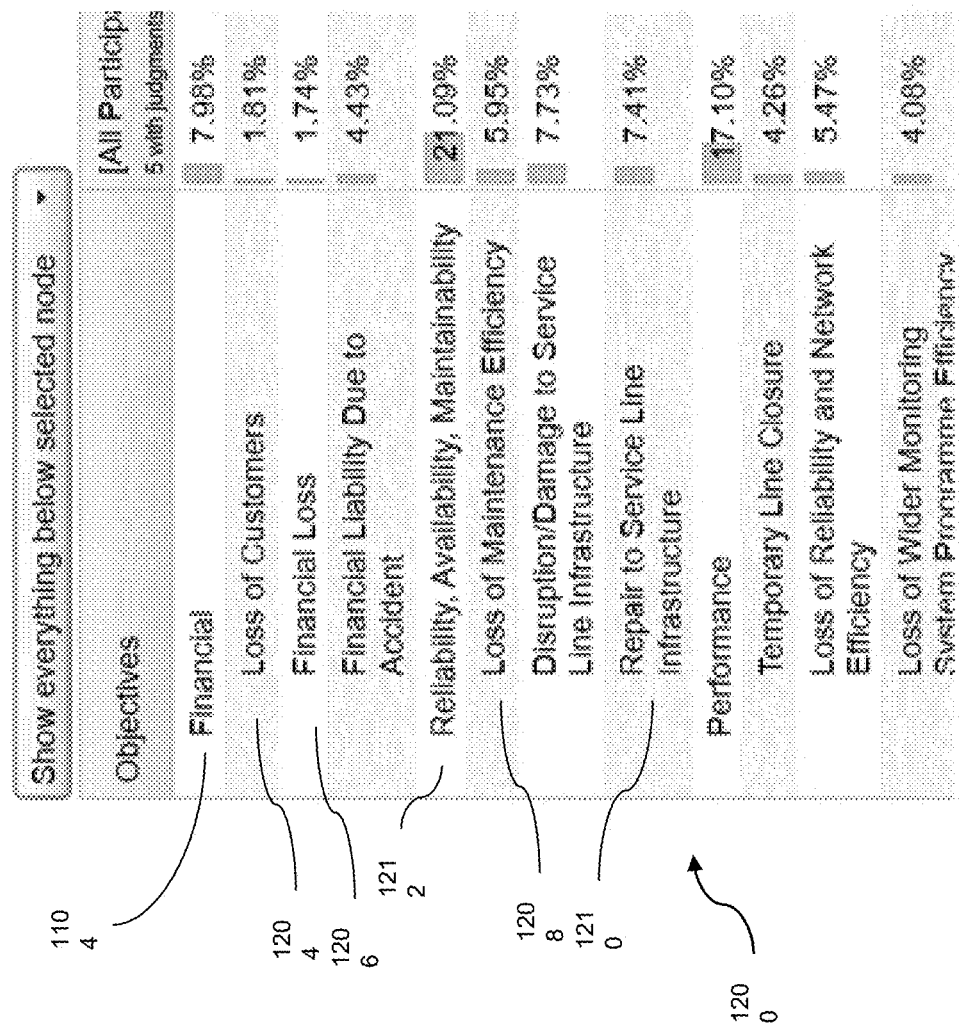
FIG. 12 is a screenshot showing, by way of an Example, a Web Page for showing computed ratio scale priorities of the objectives.

FIG. 12 is a screenshot showing, by way of an Example, a Web Page 1200 for showing computed ratio scale priorities of the objectives. For 'Financial' 1104, the ratio is 7.98%. Further, ratio scale priorities of the objectives such as 'Loss of customers' 1204 is 1.81% and 'Financial Loss' 1206 is 1.74% on the objective 'Financial' 1104.

Similarly, the ratio scale priorities for objectives such as 'Loss of Maintenance Efficiency' 1208 is 5.95% and 'Repair to Service Line Infrastructure' 1210 is 7.41% on the objective 'Reliability, Availability, Maintainability' 1212. Thus, the system computes the monetary value of each impact on the objectives from the prioritized risk events, as shown in FIG. 13 of the present invention.

Figure 13:
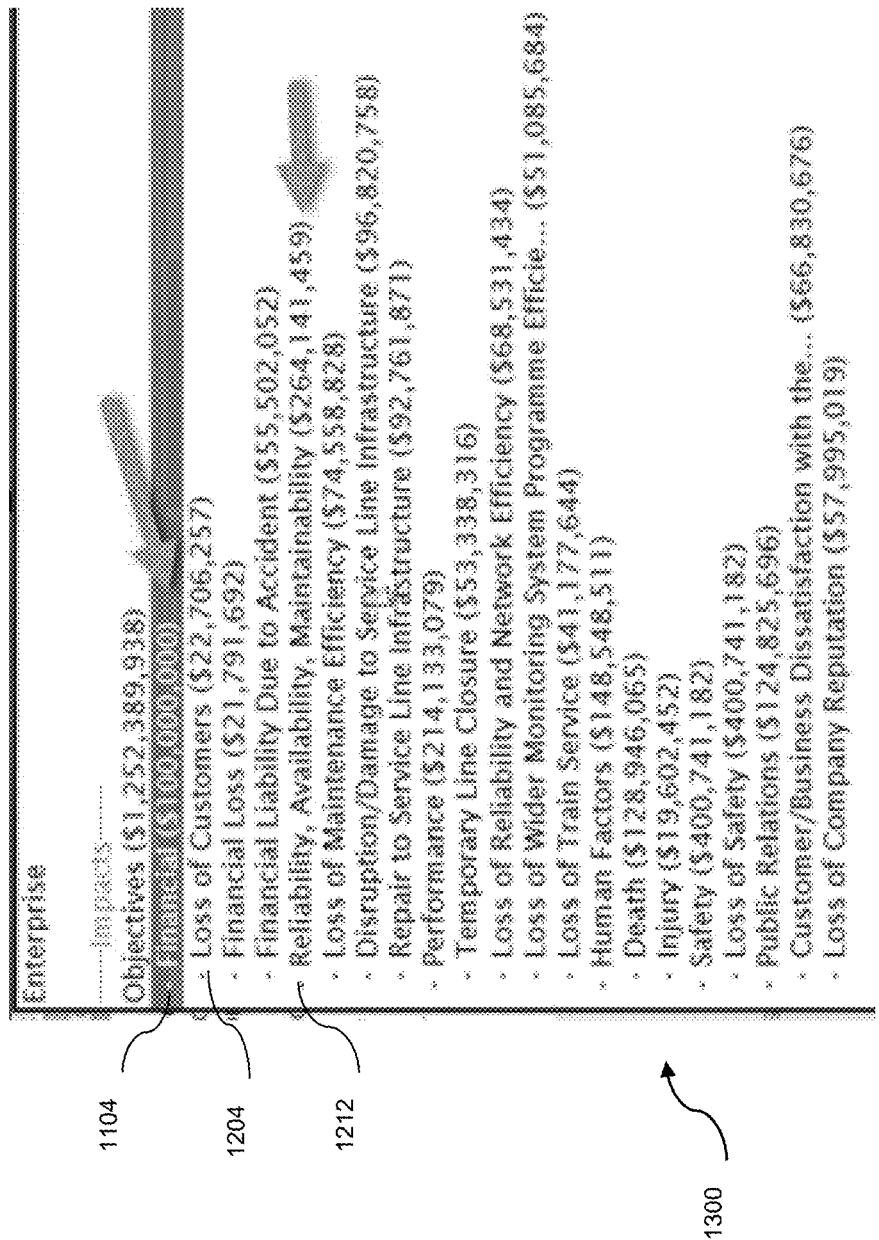
FIG. 13 is a screenshot showing, by way of an Example, a Web Page for showing monetary values of impacts of risk events on each of the objectives in the hierarchy.

FIG. 13 is a screenshot showing, by way of an Example, a Web Page 1300 for showing monetary values of impacts of risk events on each of the objectives in the hierarchy. As shown, the monetary value of impact on the Financial 1104 is $100000000. Thus, the based upon on the ratios from FIG. 12, the system automatically calculates monetary values of the other impacts such as 'Loss of customers' 1204 is $22,706,257 and 'Reliability, Availability, Maintainability' 1212 is $264,141,459.

Examples of the system 1004 include but not limited to a tablet pc, a laptop, a mobile phone using a Windows, DOS, Macintosh, UNIX or other operating system equipped with a standard web-browser application and capable of connecting to the Internet. It should be noted that the term 'Internet' is intended to encompass similar systems as well (i.e. World Wide Web or www') comprising the capability to communicate and access information through a network, telephone connections, ISDN connections, DSL connections, cable modem, etc.

The present invention should not be limited in its communication nomenclature. Exemplary operating systems include but are not limited to SymbianOS, Windows Mobile/Windows CE, Palm OS, Linux, Blackberry OS, BREW, webOS, Android, iOS, etc. which have been developed for mobile computing applications and can handle both data computing and communication applications, e.g., voice communications.

Examples of the processor 1008 includes but not limited to one or more special-purpose processing devices such as an application specific integrated circuit (ASIC), a field programmable gate array (FPGA), a digital signal processor (DSP), network processor etc. The processor 1008 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets.

The present invention offers various advantages in order to determine measures even for events that might have high impacts and very low likelihoods. Further, the present invention offers measurement of an event's risk mathematically by measuring both the event's impact and likelihood on ratio scales-which is seldom if ever done in practice today. The present invention may be used in conducting surveys in order to asses and mitigate risk events from a defined environment.

The foregoing discussion discloses and describes merely exemplary embodiments of the present invention. One skilled in the art will readily recognize from such discussion and from the accompanying drawings that various changes, modifications and variations can be made therein without departing from the spirit and scope of the invention.

The invention claimed is:

1. A system for converting ratio scale measures of risks to monetary value in a defined environment by a user over a communication network, the system comprising:
   a processor;
   an input unit coupled to the processor for receiving inputs from the user;
   a display unit to display processed information received from the processor; and
   a data storage for storing instructions related to risk events, wherein said processor configured to:
      receive a list of risk events from the events occurring in the defined environment from the user using the input unit and further stores the list of risk events in the data storage;
      receive a list of objectives associated with the risk events from the user using the input unit for assessing impacts to objectives occurring from the risk events and further stores the list of objectives in the data storage;
      receive a list of causes associated with the risk events from the user using the input unit for assessing the likelihood of occurring of the risk causes and further stores the list of causes in the data storage;
      generate a ratio scale prioritized hierarchy of importance of objectives automatically from the inputs received from the user, wherein the inputs referred to measurement techniques;
      generate a ratio scale prioritized hierarchy of likelihoods of causes of the risk events from inputs received from the user;
      generate a ratio scale prioritized list of risk events likelihoods given the associated causes from inputs received from the user;
      generate a ratio scale prioritized risks of risk events from the ratio scale prioritized likelihood of causes; ratio scale prioritized likelihood of event likelihoods given the causes; ratio scale priorities of the consequences of the events on objectives, and the ratio scale prioritize of the importance of objectives;
      receive input from the user with an estimated monetary value of at least one of the objectives in the hierarchy; and
      compute the monetary amounts of all the objectives by taking the ratio of other objectives ratio scale measures of importance to the ratio scale measurement of the objective of the hierarchy.

2. The system according to claim 1 wherein the ratio scale measurement analysis is at least one of the rating scale; pairwise comparison; direct priority input; simple utility curve; and step function ascending.

3. The system according to claim 1 wherein the ratio scale measurement analysis by the user using the input device performs a pairwise comparison of the objectives to compute the list of prioritized objectives with the associated objective value scores.

4. The system according to claim 1 wherein the ratio scale measurement analysis by the user performs a pairwise comparison of the causes to compute a list of likelihoods of the causes with associated causes value scores, using a computer.

5. The system according to claim 4 wherein the ratio scale measurement analysis by the user performs a ratio scale measurement analysis on the received associated objective, impacts, causes and likelihoods value score to compute the list of risks of the risk events with associated risk value scores.

* * * * *